US011549358B2

(12) United States Patent
Pan et al.

(10) Patent No.: US 11,549,358 B2
(45) Date of Patent: Jan. 10, 2023

(54) DEEP LEARNING METHODS FOR ENHANCING BOREHOLE IMAGES

(71) Applicant: Halliburton Energy Services, Inc., Houston, TX (US)

(72) Inventors: Li Pan, Singapore (SG); Ahmed Elsayed Fouda, Spring, TX (US); Junwen Dai, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 48 days.

(21) Appl. No.: 17/077,663

(22) Filed: Oct. 22, 2020

(65) Prior Publication Data
US 2022/0127950 A1    Apr. 28, 2022

(51) Int. Cl.
*E21B 47/002* (2012.01)
*G01V 3/18* (2006.01)
(Continued)

(52) U.S. Cl.
CPC .......... *E21B 47/0025* (2020.05); *E21B 49/00* (2013.01); *G01V 3/18* (2013.01);
(Continued)

(58) Field of Classification Search
CPC .. E21B 47/0025; E21B 49/00; E21B 2200/22; G01V 3/18; G01V 5/12; G06T 5/001; G06T 2207/20084
See application file for complete search history.

(56) References Cited

U.S. PATENT DOCUMENTS 3,060,373 A    10/1962 Doll
3,132,298 A    5/1964 Doll et al.
(Continued)

FOREIGN PATENT DOCUMENTS

CA           685727       5/1964
WO    WO-2018045602 A1 *  3/2018  .............. G06F 17/11
(Continued)

OTHER PUBLICATIONS

SPWLA 61st Annual Logging Symposium, Guner, et al., Quantitative Demonstration of a High-Fidelity Oil-Based Mud Resistivity Imager using a Controlled Experiment, Jun. 24 to Jul. 29, 2020.
(Continued)

*Primary Examiner* — Tarun Sinha
*Assistant Examiner* — Yossef Korang-Beheshti
(74) *Attorney, Agent, or Firm* — John Wustenberg; C. Tumey Law Group PLLC

(57) ABSTRACT

A method for enhancing a formation property image may include taking at least one set of formation property measurements with a borehole imaging device, arranging the at least one set of formation property measurements into a two-dimensional image with a buffer, feeding the two-dimensional image into a deep-learning neural network (DNN), and forming a corrected formation property image from the two-dimensional image. The method may further include inverting the at least one set of formation property measurements to form at least one set of inverted formation property measurements and arranging the at least one set of inverted formation property measurements into a two-dimensional image with a buffer.

20 Claims, 11 Drawing Sheets

(51) Int. Cl.
*G01V 5/12* (2006.01)
*G06T 5/00* (2006.01)
*E21B 49/00* (2006.01)

(52) U.S. Cl.
CPC .............. *G01V 5/12* (2013.01); *G06T 5/001* (2013.01); *E21B 2200/22* (2020.05); *G06T 2207/20084* (2013.01)

(56) References Cited

U.S. PATENT DOCUMENTS

| | | |
|---|---|---|
| 3,379,963 A | 4/1968 | Saurenman |
| 3,379,964 A | 4/1968 | Segesman |
| 3,579,098 A | 5/1971 | Mougne |
| 4,251,773 A | 2/1981 | Cailliau et al. |
| 4,468,623 A | 8/1984 | Gianzero et al. |
| 4,545,242 A | 10/1985 | Chan |
| 4,567,759 A | 2/1986 | Ekstrom et al. |
| 4,692,908 A | 9/1987 | Ekstrom et al. |
| 4,851,781 A | 7/1989 | Marzetta et al. |
| 4,862,090 A | 8/1989 | Vannier et al. |
| 5,008,625 A | 4/1991 | Chen |
| 5,012,193 A | 4/1991 | Chen |
| 5,038,378 A | 8/1991 | Chen |
| 6,191,588 B1 | 2/2001 | Chen |
| 7,821,673 B2 | 10/2010 | Fazzini |
| RE42,493 E | 6/2011 | Tabarovsky et al. |
| 8,579,037 B2 | 11/2013 | Jacob |
| 9,678,239 B2 | 6/2017 | Habashy et al. |
| 2015/0260874 A1 | 9/2015 | Chen et al. |
| 2015/0300158 A1 | 10/2015 | San Martin et al. |
| 2015/0301215 A1 | 10/2015 | San Martin et al. |
| 2015/0309201 A1 | 10/2015 | Wu et al. |
| 2015/0369951 A1 | 12/2015 | San Martin et al. |
| 2016/0003973 A1 | 1/2016 | Guner et al. |
| 2016/0216397 A1 | 7/2016 | Donderici et al. |
| 2016/0298444 A1 | 10/2016 | Donderici et al. |
| 2016/0369626 A1 | 12/2016 | Donderici et al. |
| 2017/0248728 A1 | 8/2017 | Fouda et al. |
| 2017/0248730 A1 | 8/2017 | San Martin et al. |
| 2017/0269253 A1 | 9/2017 | Fouda et al. |
| 2018/0016888 A1 | 1/2018 | San Martin et al. |
| 2018/0106141 A1 | 4/2018 | Fouda et al. |
| 2018/0106763 A1 | 4/2018 | Fouda et al. |
| 2018/0106764 A1 | 4/2018 | Fouda et al. |
| 2018/0197278 A1 | 7/2018 | Lee et al. |
| 2018/0258755 A1 | 9/2018 | Donderici et al. |
| 2019/0003815 A1 | 1/2019 | San Martin et al. |
| 2019/0078430 A1 | 3/2019 | Fouda et al. |
| 2019/0086320 A1 | 3/2019 | Guner et al. |
| 2019/0086575 A1 | 3/2019 | Fouda et al. |
| 2019/0087939 A1* | 3/2019 | Hakimuddin .......... G06V 10/40 |
| 2019/0088988 A1 | 3/2019 | Hayner et al. |
| 2019/0113650 A1 | 4/2019 | Guner et al. |
| 2019/0190532 A1 | 6/2019 | Gupta |
| 2019/0203580 A1 | 7/2019 | Guner et al. |
| 2019/0218904 A1 | 7/2019 | Fouda et al. |
| 2019/0277995 A1 | 9/2019 | Fouda et al. |
| 2019/0339230 A1 | 11/2019 | Khalaj Amineh et al. |
| 2019/0346584 A1 | 11/2019 | Wu et al. |
| 2019/0369285 A1 | 12/2019 | Fouda et al. |
| 2020/0041683 A1 | 2/2020 | Donderici et al. |
| 2020/0073004 A1 | 3/2020 | Fouda et al. |
| 2020/0182830 A1 | 6/2020 | Fouda et al. |
| 2020/0200940 A1 | 6/2020 | Fouda et al. |
| 2020/0209425 A1 | 7/2020 | Ewe et al. |
| 2020/0270982 A1 | 8/2020 | Pan et al. |
| 2020/0271818 A1 | 8/2020 | Fouda et al. |
| 2020/0284141 A1 | 9/2020 | San Martin et al. |
| 2020/0301036 A1* | 9/2020 | Ramfjord ................. G01V 1/50 |
| 2020/0308957 A1 | 10/2020 | Fan et al. |
| 2020/0309984 A1 | 10/2020 | Pan et al. |
| 2020/0309986 A1 | 10/2020 | Donderici et al. |
| 2020/0319362 A1 | 10/2020 | Guner et al. |
| 2020/0333500 A1 | 10/2020 | Fouda et al. |

FOREIGN PATENT DOCUMENTS

| | | |
|---|---|---|
| WO | 2018201114 | 11/2018 |
| WO | 2018-236748 | 12/2018 |
| WO | 2019177588 | 9/2019 |
| WO | 2020086874 | 4/2020 |

OTHER PUBLICATIONS

Chen, et al. A Novel Array Laterolog Method, Oct. 1998.
SPWLA 38th Annual Logging Symposium, Vigne, et al., Strange Invasion Profiles: What Multiarray Induction Logs can tell us about how Oil-Based Mud affects the invasion process and wellbore stability, Jun. 1997.
SPE22726, Safinya, et al., Improved Formation Imaging with Extended Microelectrical Arrays, 1991.
SPE30584, Smits, et al., High Resolution from a New Laterolog with Azimuthal Imaging, 1995.
SPE Formation Evaluation, Davies, et al., Azimuthal Resistivity Imaging: A New-Generation Laterolog, Sep. 1994.
SPE401, Suau, et al., The Dual Laterolog-R Tool, Jul. 1973.
International Search Report and Written Opinion for Application No. PCT/US2020/058115, dated Jul. 6, 2021.
U.S. Appl. No. 16/835,115, filed Mar. 30, 2020.
Halliburton, StrataXaminer™ Imaging Service, H013996, Jun. 2021.
Halliburton, Borehole Imaging, Available at https://www.hallibudon.com/en-US/ps/solutions/formation-evaluation/borehole-imaging/default.html.
Schlumberger, Imaging: Getting the picture downhole, Sep. 2015.
Schlumberger, MicroScope HD 675, 2017.
Schlumberger, FMI HD, 2013.
Schlumberger, QuantaGeo, rPhotorealistic Reservoir Geology Service, 2014.
The AAPG, Borehole Image Tool Design, Value of Information, and Tool Selection, WL, WBM XRMI, 2010.
Halliburton, Wireline & Perforating Listen & Respond, WL, OBM OMRI, H012450, Jan. 2017.
Baker Hughes, GeoXplorer imaging service, Available at https://www.bakerhughes.com/integrated-well-services/integrated-well-construction/evaluation/wireline-openhole-logging/wireline-imaging/geoxplorer-imaging-service.
Y.H. Chen et al., Inversion-Based Workflow for Quantitative Interpretation of the New-Generation Oil-Based Mud Resistivity Imager, SPWLA 55th Annual Logging Symposium, May 2014.
Bloemenkamp et al., Design and Field Testing of a New High-definition Microresistivity Imaging Tool Engineered for oil-based mud, SPWLA 55th Annual Logging Symposium, May 2014.
Bayraktar et al., "Quantitative Interpretation of Oil-base Mud Microresistivity Imager Via Artificial Neural Networks," SPWLA 60th Annual Logging Symposium, Jun. 2019.
Weigend, On Overfitting and the Effective Number of Hidden Units; CU-CS-674-93, 1993.
U.S. Appl. No. 16/579,513.

\* cited by examiner

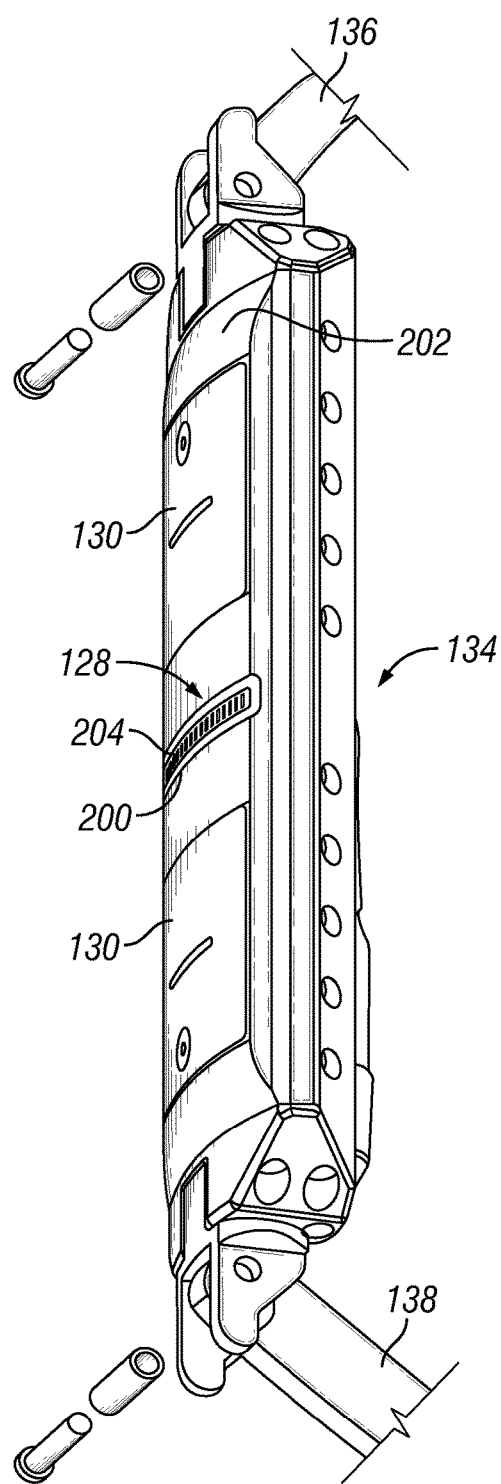
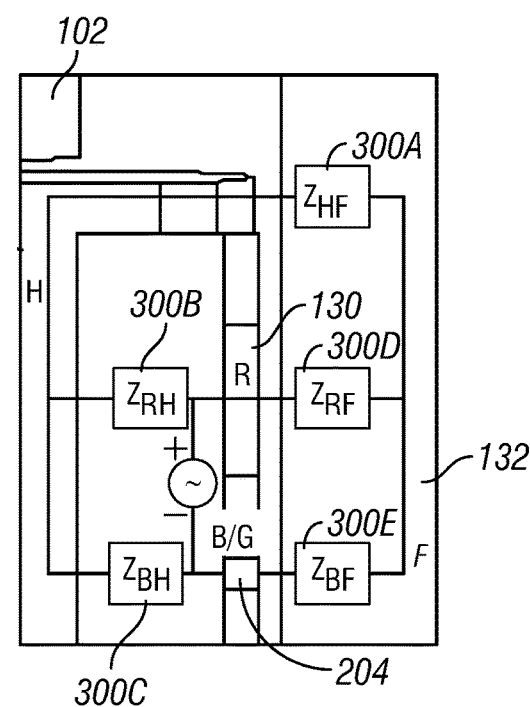
FIG. 2
FIG. 3

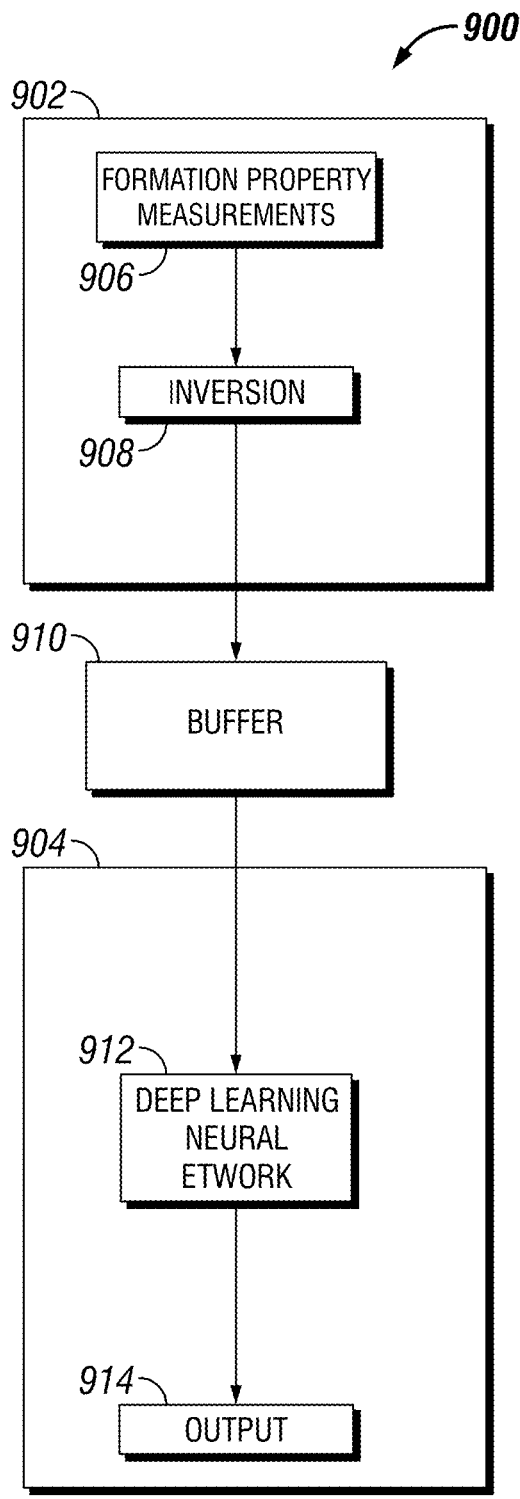
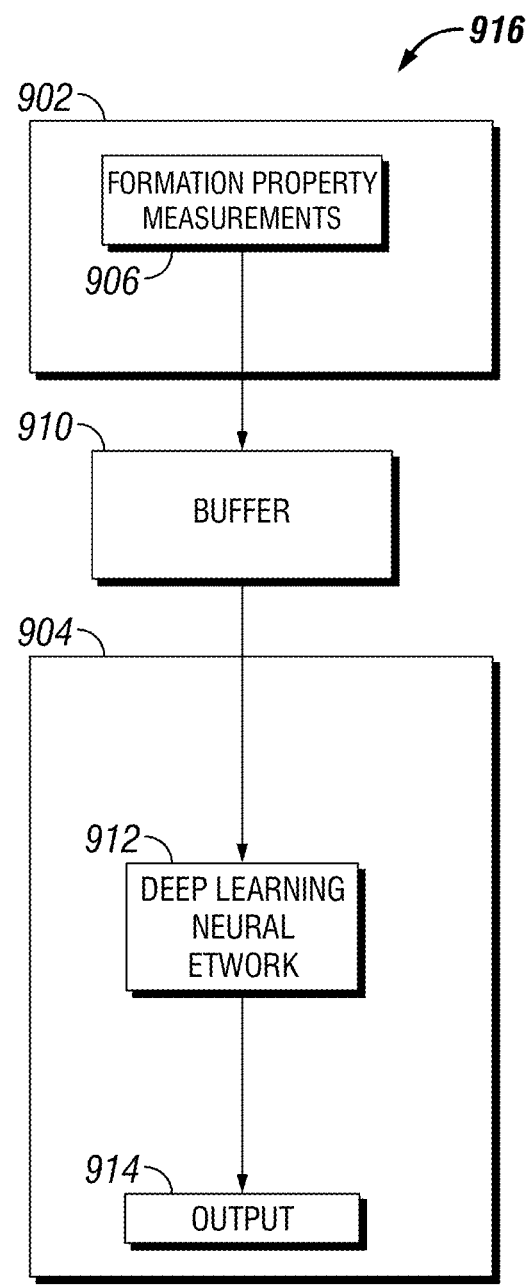
*FIG. 9A*  *FIG. 9B*

DEEP LEARNING METHODS FOR ENHANCING BOREHOLE IMAGES

BACKGROUND

Boreholes drilled into subterranean formations may enable recovery of desirable fluids (e.g., hydrocarbons) using a number of different techniques. A downhole tool may be employed in subterranean operations to determine borehole and/or formation properties.

Traditionally, borehole imager tools may be used in obtaining a detailed characterization of reservoirs. These borehole imager tools may provide a formation property image of the formation immediately surrounding the borehole. Borehole imaging tools may be used to determine formation stratigraphy, formation resistivity, dips of the formation layers as well as, borehole and formation stress. During drilling operations borehole imaging tools may be particularly important in learning about and detecting thin beds, fracture locations, and low resistivity formations.

Borehole imaging tools may also be referred to as a High Fidelity Borehole Imager (HFBI) tool, which is a high-resolution imaging tool that functions and operates to acquire high-resolution images of the formation property. Unfortunately, the resolution and accuracy of the HFBI borehole image may not be accurate or reliable due to a standoff effect and existing inversion schemes that are based on simplified models.

BRIEF DESCRIPTION OF THE DRAWINGS

For a detailed description of the examples of the disclosure, reference will now be made to the accompanying drawings in which:

FIG. 2 illustrates an example of a pad;

FIG. 3 is a circuit model that may approximate an isolated pad from FIG. 2;

FIG. 9A is a workflow to improve a formation property image using a Deep-learning Neural Network (DNN);

FIG. 9B is a workflow to form a formation property image using a DNN;

DETAILED DESCRIPTION

The present disclosure discloses a system and method for improving or forming a formation property image utilizing a Deep-learning Neural Network (DNN). Using a DNN may improve the accuracy and reliability of formation property images formed from formation property measurements taken by a borehole imaging device. This may allow for increased resolution and the identification of thin-bed formations or other formation properties. The methods described below may be utilized with current systems and methods using the DNN.

Figure 1:
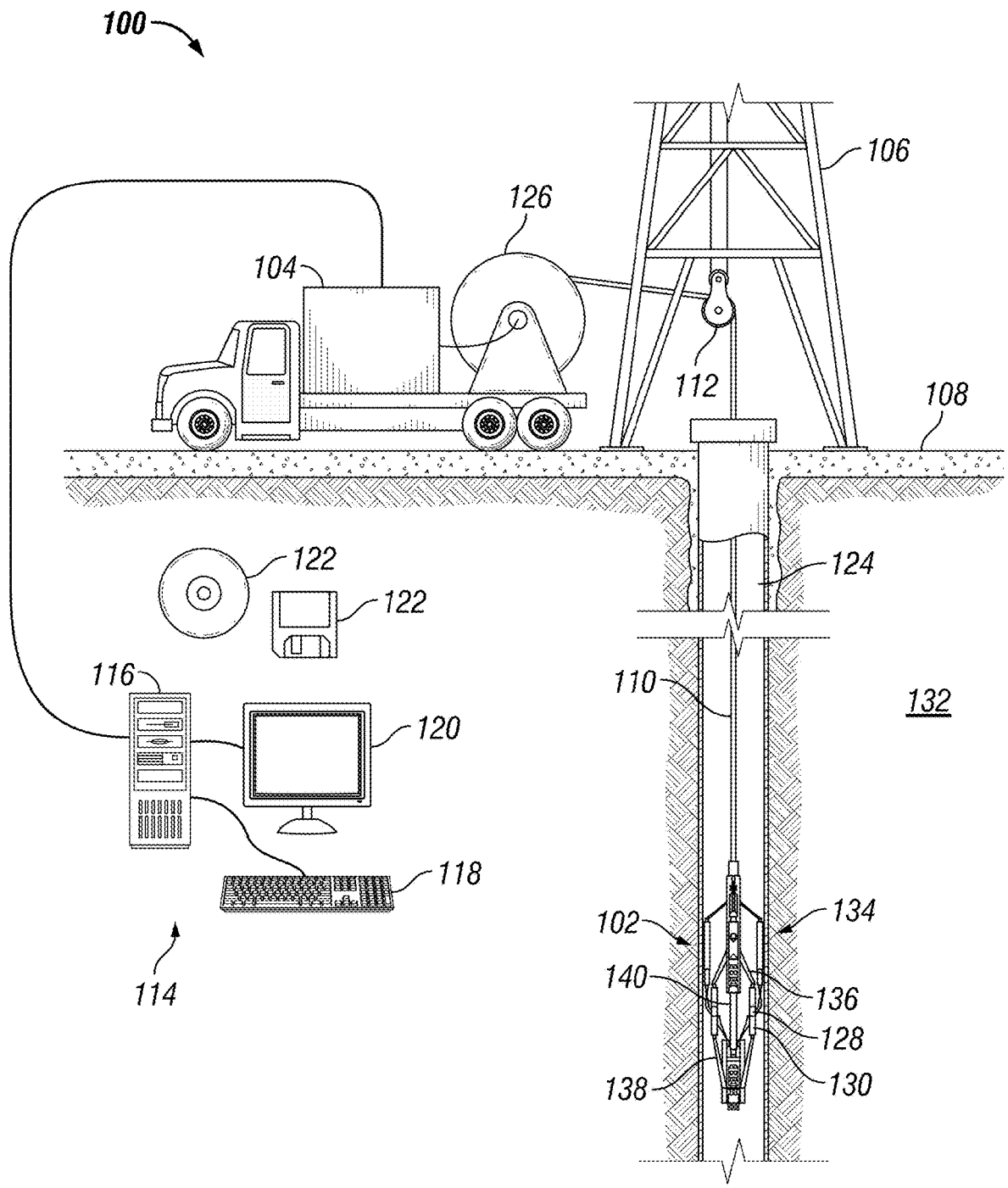
FIG. 1 illustrate an example of a well measurement system.

FIG. 1 illustrates a cross-sectional view of an example of a well measurement system 100. As illustrated, well measurement system 100 may include borehole imaging device 102 attached to a vehicle 104. In examples, it should be noted that borehole imaging device 102 may not be attached to a vehicle 104. Borehole imaging device 102 may be supported by rig 106 at surface 108. Borehole imaging device 102 may be tethered to vehicle 104 through conveyance 110. Conveyance 110 may be disposed around one or more sheave wheels 112 to vehicle 104. Conveyance 110 may include any suitable means for providing mechanical conveyance for borehole imaging device 102, including, but not limited to, wireline, slickline, coiled tubing, pipe, drill pipe, drill string, downhole tractor, or the like. In some examples, conveyance 110 may provide mechanical suspension, as well as electrical connectivity, for borehole imaging device 102.

Conveyance 110 may include, in some instances, a plurality of electrical conductors extending from vehicle 104. Conveyance 110 may include an inner core of seven electrical conductors covered by an insulating wrap. An inner and outer steel armor sheath may be wrapped in a helix in opposite directions around the conductors. The electrical conductors may be used for communicating power and telemetry between vehicle 104 and borehole imaging device 102.

Conveyance 110 may lower borehole imaging device 102 in borehole 124. Generally, borehole 124 may include horizontal, vertical, slanted, curved, and other types of borehole geometries and orientations. Imaging tools may be used in uncased sections of the borehole. Measurements may be made by borehole imaging device 102 in cased sections for purposes such as calibration.

As illustrated, borehole 124 may extend through formation 132. As illustrated in FIG. 1, borehole 124 may extend generally vertically into the formation 132, however borehole 124 may extend at an angle through formation 132, such as horizontal and slanted boreholes. For example, although FIG. 1 illustrates a vertical or low inclination angle well, high inclination angle or horizontal placement of the well and equipment may be possible. It should further be noted that while FIG. 1 generally depicts a land-based operation, those skilled in the art may recognize that the principles described herein are equally applicable to subsea operations that employ floating or sea-based platforms and rigs, without departing from the scope of the disclosure.

Information from borehole imaging device 102 may be gathered and/or processed by information handling system 114. For example, signals recorded by borehole imaging device 102 may be stored on memory and then processed by borehole imaging device 102. The processing may be performed real-time during data acquisition or after recovery of borehole imaging device 102. Processing may alternatively occur downhole or may occur both downhole and at surface. In some examples, signals recorded by borehole imaging device 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to borehole imaging device 102.

Systems and methods of the present disclosure may be implemented, at least in part, with information handling system 114. While shown at surface 108, information handling system 114 may also be located at another location, such as remote from borehole 124. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as an input device 118 (e.g., keyboard, mouse, etc.) and video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

As discussed below, methods may utilize an information handling system 114 to determine and display a high-resolution formation property image of formation 132 immediately surrounding borehole 124. This high-resolution formation property image may depict boundaries of subsurface structures, such as a plurality of layers disposed in formation 132. These formation images may be used in reservoir characterization. Formation images with high resolution may allow accurate identification of thin beds and other fine features such as fractures, clasts and vugs. These formation images may provide information about the sedimentology, lithology, porosity and permeability of formation 132. The formation images may complement, or in some cases replace, the process of coring.

Borehole imaging device 102 may include a plurality of electrodes, such as button array 128. Borehole imaging device 102 may also include a return electrode 130. It should be noted that the plurality of electrodes disposed on button array 128 may be any suitable electrode and is should be further noted that return electrode 130 may be any suitable electrode. Button array 128 and/or return electrode 130 may be disposed on at least one pad 134 in any suitable order. For example, a pad 134 may include only button arrays 128 and/or return electrodes 130. Further, a pad 134 may include both button array 128 and return electrodes 130. Pads 134 may attach to a mandrel 140 of borehole imaging device 102 through upper arm 136 and lower arm 138. It should be noted that mandrel 140 may be defined as the supporting structure of borehole imaging device 102 which may act as a platform for any peripheral (e.g., upper arm 136, lower arm 138, conveyance 110, etc.) to attach to borehole imaging device 102. Upper arm 136 and lower arm 138 may extend pad 134 away from borehole imaging device 102. In examples, both upper arm 136 and lower arm 138 may place pad 134 in contact with borehole 124. It should be noted that there may be any suitable number of arms and/or extensions that may be used to move pad 134 away from borehole imaging device 102 and in close proximity with borehole 124, or vice versa.

During operations, an operator may energize an individual electrode, or any number of electrodes, of button array 128. A voltage may be applied between the electrode of button array 128 and return electrode 130. The level of the voltage may be controlled by information handling system 114. This may cause currents to be transmitted through the electrode of button array 128. It should be noted that there may be any number of currents transmitted into formation 132. These currents may travel through the mud disposed in borehole 124 and formation 132 and may reach back to return electrode 130. The amount of current emitted by each electrode may be inversely proportional to the impedance seen by the electrode. This impedance may be affected by the properties of formation 132 and the mud directly in front of each electrode of button array 128. Therefore, current emitted by each electrode may be measured and recorded in order to obtain a formation image of the resistivity of formation 132.

To produce a formation property image of formation 132, a current may be emitted from at least one electrode from button array 128 and return to return electrode 130. In examples, current may be emitted from any transmission type electrode along borehole imaging device 102. These two electrodes may be referred to as the current electrodes. Then, the voltage drop across a pair of the electrodes of button array 128 may be measured and used to estimate the impedance of formation 132. In these alternative implementations, button electrodes may be referred to as voltage electrodes or monitor electrodes. Proposed method may operate in any of the two designs above or any other similar oil-based mud resistivity imager tool without any limitations.

In examples, borehole imaging device 102 may operate with additional equipment (not illustrated) on surface 108 and/or disposed in a separate well measurement system (not illustrated) to record measurements and/or values from formation 132 to render a formation property image of formation 132. Without limitation, borehole imaging device 102 may be connected to and/or controlled by information handling system 114, which may be disposed on surface 108. Without limitation, information handling system 114 may be disposed down hole in borehole imaging device 102. Processing of information recorded may occur down hole and/or on surface 108. In addition to, or in place of processing at surface 108, processing may occur downhole. Processing occurring downhole may be transmitted to surface 108 to be recorded, observed, and/or further analyzed. Additionally, information recorded on information handling system 114 that may be disposed down hole may be stored until borehole imaging device 102 may be brought to surface 108. In examples, information handling system 114 may communicate with borehole imaging device 102 through a fiber optic cable (not illustrated) disposed in (or on) conveyance 110. In examples, wireless communication may be used to transmit information back and forth between information handling system 114 and borehole imaging device 102. Information handling system 114 may transmit information to borehole imaging device 102 and may receive as well as process information recorded by borehole imaging device 102. In examples, a downhole information handling system (not illustrated) may include, without limitation, a microprocessor or other suitable circuitry, for estimating, receiving and processing signals from borehole imaging device 102. Downhole information handling system (not illustrated) may further include additional components, such as memory, input/output devices, interfaces, and the like. In examples, while not illustrated, borehole imaging device 102 may include one or more additional components, such as analog-to-digital converter, filter and amplifier, among others, that may be used to process the measurements of borehole imaging device 102 before they may be transmitted to surface 108. Alternatively, raw measurements from borehole imaging device 102 may be transmitted to surface 108.

Any suitable technique may be used for transmitting signals from borehole imaging device 102 to surface 108. As illustrated, a communication link (which may be wired or wireless and may be disposed in conveyance 110, for example) may be provided that may transmit data from borehole imaging device 102 to an information handling system 114 at surface 108.

FIG. 2 illustrates an example of pad 134. It should be noted that pad 134 may be connected to borehole imaging device 102 (e.g., referring to FIGS. 1 and 2). Pad 134 may serve to place button array 128 and/or return electrode 130 in contact with or in close proximity to borehole 124 (e.g., referring to FIG. 1). Pad 134 may include a button array 128, a return electrode 130, a guard 200, and a housing 202. In examples, there may be a plurality of button arrays 128. In examples, return electrode 130 and button array 128 may be disposed directly on borehole imaging device 102. Button array 128 may include an injector electrode 204, wherein injector electrode 204 may be a sensor that senses impedance of formation 132. It should be noted that injector electrode 204 may be a button electrode. There may be any suitable number of injector electrodes 204 within button array 128 that may produce a desired, predetermined current. Without limitation, the range for a suitable number of injector electrodes 204 within button array 128 may be from about one injector electrode 204 to about one hundred injector electrodes 204. For example, the range for a suitable number of injector electrodes 204 within button array 128 may be from about one injector electrode 204 to about twenty-five injector electrodes 204, from about twenty-five injector electrodes 204 to about fifty injector electrodes 204, from about fifty injector electrodes 204 to about seventy-five injector electrodes 204, or from about seventy-five injector electrodes 204 to about one hundred injector electrodes 204.

In examples, there may be a plurality of return electrodes 130. One of the return electrodes 130 may be disposed on one side of button array 128, and another one of the return electrodes 130 may be disposed on the opposite side of button array 128. These return electrodes 130 may be disposed at equal distances away from button array 128 or at varying distances from button array 128. Without limitation, the distance from the center of one of the return electrodes to the button array may be from about one inch to about one foot. In examples, a voltage difference between button array 128 and return electrodes 130 may be applied, which may cause currents to be emitted from button array 128 into the mud (not illustrated) and formation 132 (referring to FIG. 1).

During operations, an operator may energize button array 128. A voltage may be applied between each injector electrode 204 and return electrode 130. The level of the voltage may be controlled by information handling system 114. This may cause currents to be transmitted through button array 128. These currents may travel through the mud and formation 132 and may reach back to return electrode 130. The amount of current emitted by each injector electrode 204 may be inversely proportional to the impedance seen by that injector electrode 204. This impedance may be affected by the properties of formation 132 and the mud directly in front of each injector electrode 204. Therefore, current emitted by each injector electrode 204 may be measured and recorded in order to obtain an image of the resistivity of formation 132.

In examples, a current may be transmitted from injector electrode 204 and return to return electrode 130. These two electrodes may be referred to as the current electrodes. Then, the voltage drops across button array 128 may be measured and used to estimate the impedance of formation 132. In these alternative implementations, electrodes of button array 128 may be referred to as voltage electrodes or monitor electrodes. Proposed method may operate in any of the two designs above or any other similar oil-based mud resistivity imager tool without any limitations. In the rest of the text, the imager tool will be assumed to be of the first design without any loss of generality. In examples, generally water based mud imagers do not require capacitive contact with formation 132 (e.g., referring to FIG. 1) because the resistivity of water based muds is lower than oil based muds. This allows water based mud imager tools to operate at lower frequencies the oil based mud imager tools. Likewise, interpretation of images obtained with a water based mud imager is simpler as mud properties and formation permittivity have negligible effect on measurements, in which case the disclosed processing methods may not be needed. However, there may be applications where the disclosed techniques may be applied to the water based mud imager tools; for example, to further increase the accuracy of the image or in a case where an imager tool designed for oil based muds is operated in a water based mud. Thus, although the disclosed techniques are contemplated to be primarily applicable to oil based mud imager tools, the scope of the disclosure is not limited to just oil based muds.

Returning back to FIG. 2, guard 200 may help to focus most of the current produced by button array 128 into formation 132 radially. Guard 200 may be disposed around button array 128. Guard 200 may include the same potential as button array 128.

In examples, housing 202 may serve to protect button array 128 and return electrodes 130 from the surrounding mud and formation 132. Housing may be made with any suitable material. Without limitation, suitable material may include metals, nonmetals, plastics, ceramics, composites and/or combinations thereof. In examples, housing 202 may be a metal plate. Housing 202 may be connected through upper arm 136 to borehole imaging device 102 (e.g., referring to FIG. 1). An insulating material may be used to fill the remaining portions of pad 134. In examples, ceramics may be used as the insulating material to fill the remaining portions of pad 134.

An impedance value may be calculated through the current transmitting between an injector electrode 204 and formation 132 for each injector electrode 204. The voltage between button array 128 and return electrodes 130 may be measured and divided by the transmitted current to produce a value for the impedance seen by each injector electrode 204. Most of the transmitted current may be returned to return electrodes 130 although some portions of it may return through housing 202 and borehole imaging device 102 (e.g., referring to FIG. 1).

During logging operations, measurement data taken by pad 134 may include effects of resistivity and permittivity. Measurements may contain contributions from oil-based mud that is may be disposed between pad 134 and the wall of borehole 124 as well as the signal coming from the formation. In general, the measurement medium of pad 134 may be modeled as a homogeneous formation with a thin layer of oil-based mud between pad 134 and formation 132. When pad 134 is placed on formation 132 without a mud layer, response measurement may only be from formation 132. However, when there is a mud layer present, the response is influenced by the thickness of the mud layer as well as the mud properties, in addition to the properties of formation 132 behind the mud layer. That being said, the response for certain formations 132 predominantly consist of the mud signal, which may make this response suitable for determining mud properties.

FIG. 3 illustrates an example of a circuit model that may approximate the pad 134 illustrated in FIG. 2. Effects of the transmitted current may be approximately characterized by a housing-to-formation impedance value 300A, a return electrode-to-housing impedance value 300B, a return electrode-to-formation impedance value 300C, a button-to-housing impedance value 300D, and a button-to-formation impedance value 300E. Impedance may be calculated below, wherein Z is the impedance, $v_{BR}$ is the button-to-return electrode voltage and $I_B$ is the button current:

$$Z = \frac{V_{BR}}{I_B} \quad (1)$$

The value calculated in Equation (1) may be equal to $Z_{BF}+Z_{RF}$, as shown in FIG. 3, wherein $Z_{BF}$ is the impedance from injector electrode 204 to formation 132 and $Z_{RF}$ is the impedance of return electrode 130 to formation 132. Note that for different injector electrodes 204 of the button array 128, these impedances may differ based on the variations in borehole 124 (e.g., referring to FIGS. 1 and 2) and the environment. These variations in measured impedances in an impedance image may be used to determine geophysical features. Also note that both $Z_{BF}$ and $Z_{RF}$ have contributions from both the surrounding mud and formation 132 (e.g., referring to FIG. 1). Thus, equivalently it can be written in Equation (2) as:

$$Z \approx Z_{BF} = Z_{mud} + Z_F \quad (2)$$

As a result, measured impedance may have contributions from both the mud and formation 132, wherein $Z_{mud}$ the impedance of the mud and $Z_F$ is the impedance of formation 132. Imaginary parts of $Z_F$ and $Z_{mud}$ may be assumed to be mainly capacitive. Assuming this capacitance may be in parallel with the resistive portion, then $Z_{BF}$ may also be written as:

$$Z_{BF} = \frac{1}{\left(\frac{1}{R_M} + j\omega C_M\right)} + \frac{1}{\left(\frac{1}{R_F} + j\omega C_F\right)} \quad (3)$$

wherein $R_M$ is the mud resistance, $R_F$ is the resistance of formation 132, $C_M$ is the mud capacitance, $C_F$ is the capacitance of formation 132, j is the unit imaginary number, and ω is the angular frequency. Both the mud resistance and mud capacitance may increase as standoff increases and may decrease with the increase in effective area of injector electrode 204. "Standoff" may be used to denote the distance of the pad 134 (e.g., Referring to FIG. 4) from a wall of borehole 124 (e.g., referring to FIG. 1). Standoff of each injector electrode 204 in button array 128 may vary. In examples, standoffs of return electrode 130 may differ from those of injector electrodes 204 as well. Standoff variations may significantly affect button-to-formation impedance value 300E. In the simplified circuit model, it may be assumed that the standoff of each component of pad 134 may be constant. Standoff may assume that pad 134 is movable while borehole imaging device 102 remains immobile. In examples, to achieve large distances from the wall of borehole 124, borehole imaging device 102 may be moved along with pad 134. In examples, the term "eccentricity" may be used instead of "standoff". The proposed methods (discussed further below) may be equally valid whether pad 134 moves or both pad 134 and borehole imaging device 102 move.

Equation (3) may be used to obtain basic performance curves for borehole imaging device 102. These basic performance curves may be fairly accurate in homogeneous formations 132 (e.g., referring to FIG. 1) in determining the variation of the response of an exemplary injector electrode 204 in button array 128 with changing environmental parameters.

Figure 4:
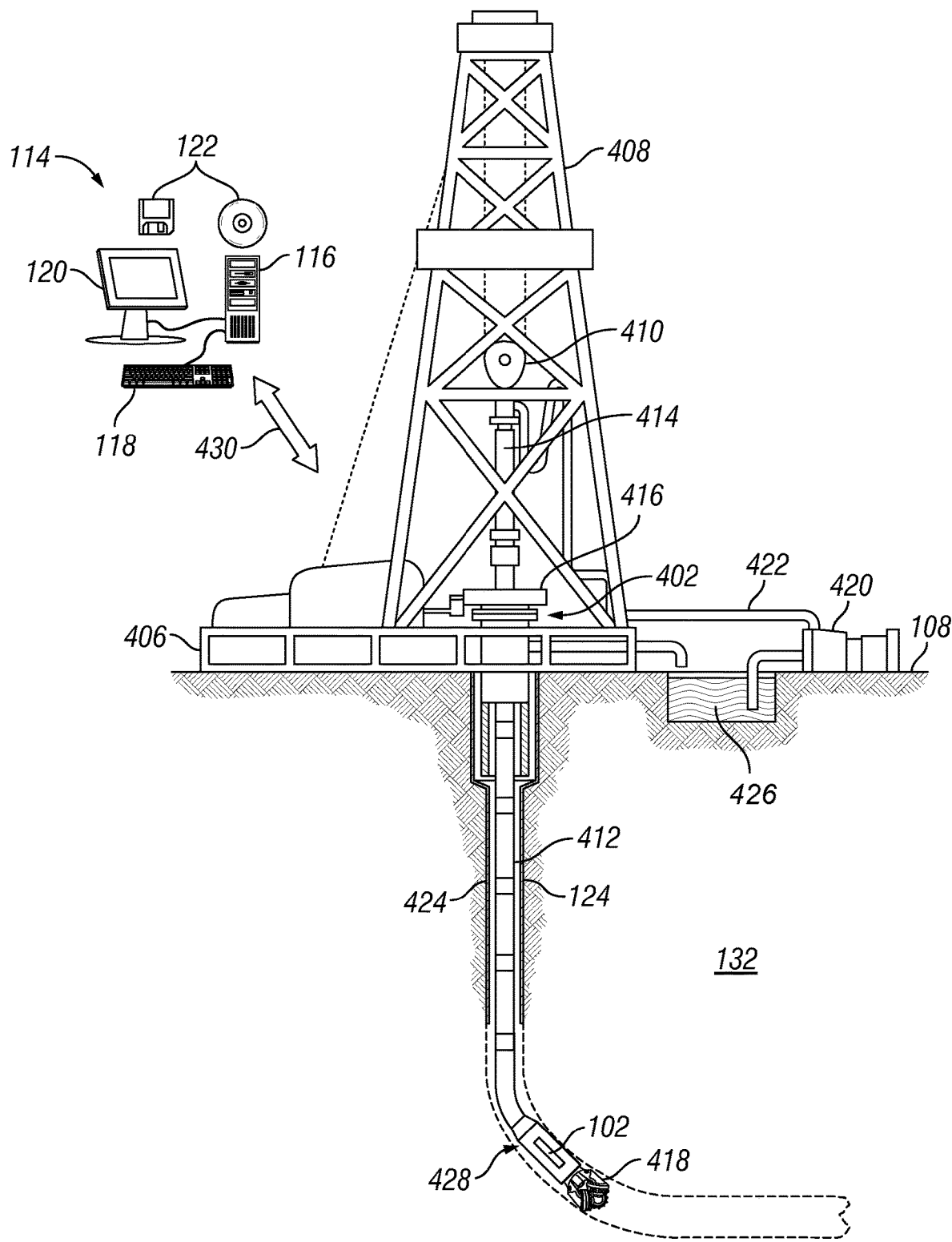
FIG. 4 illustrates another example of a well measurement system.

FIG. 4 illustrates an example in which borehole imaging device 102 may be disposed in a drilling system 300. As illustrated, borehole 124 may extend from a wellhead 402 into formation 132 from surface 108. As illustrated, a drilling platform 406 may support a derrick 408 having a traveling block 410 for raising and lowering drill string 412. Drill string 412 may include, but is not limited to, drill pipe and coiled tubing, as generally known to those skilled in the art. A kelly 414 may support drill string 412 as it may be lowered through a rotary table 416. A drill bit 418 may be attached to the distal end of drill string 412 and may be driven either by a downhole motor and/or via rotation of drill string 412 from surface 108. Without limitation, drill bit 418 may include, roller cone bits, PDC bits, natural diamond bits, any hole openers, reamers, coring bits, and the like. As drill bit 418 rotates, it may create and extend borehole 124 that penetrates various formations 132. A pump 420 may circulate drilling fluid through a feed pipe 422 to kelly 414, downhole through interior of drill string 412, through orifices in drill bit 418, back to surface 108 via annulus 424 surrounding drill string 412, and into a retention pit 426.

With continued reference to FIG. 4, drill string 412 may begin at wellhead 402 and may traverse borehole 124. Drill bit 418 may be attached to a distal end of drill string 412 and may be driven, for example, either by a downhole motor and/or via rotation of drill string 412 from surface 108. Drill bit 418 may be a part of bottom hole assembly 428 at distal end of drill string 412. Bottom hole assembly 428 may further include borehole imaging device 102. Borehole imaging device 102 may be disposed on the outside and/or within bottom hole assembly 428. As will be appreciated by those of ordinary skill in the art, bottom hole assembly 428 may be a measurement-while drilling (MWD) or logging-while-drilling (LWD) system.

Without limitation, bottom hole assembly 428 may be connected to and/or controlled by information handling system 114, which may be disposed on surface 108. Without limitation, information handling system 114 may be disposed down hole in bottom hole assembly 428. Processing of information recorded may occur down hole and/or on surface 108. Processing occurring downhole may be transmitted to surface 108 to be recorded, observed, and/or further analyzed. Additionally, information recorded on information handling system 114 that may be disposed down hole may be stored until bottom hole assembly 428 may be brought to surface 108. In examples, information handling system 114 may communicate with bottom hole assembly 428 through a fiber optic cable (not illustrated) disposed in (or on) drill string 412. In examples, wireless communication may be used to transmit information back and forth between information handling system 114 and bottom hole assembly 428. Information handling system 114 may transmit information to bottom hole assembly 428 and may receive as well as process information recorded by bottom hole assembly 428. In examples, a downhole information handling system (not illustrated) may include, without limitation, a microprocessor or other suitable circuitry, for estimating, receiving and processing signals from bottom hole assembly 428. Downhole information handling system (not illustrated) may further include additional components, such as memory, input/output devices, interfaces, and the like. In examples, while not illustrated, bottom hole assembly 428 may include one or more additional components, such as analog-to-digital converter, filter and amplifier, among others, that may be used to process the measurements of bottom hole assembly 428 before they may be transmitted to surface 108. Alternatively, raw measurements from bottom hole assembly 428 may be transmitted to surface 108.

Any suitable technique may be used for transmitting signals from bottom hole assembly 428 to surface 108, including, but not limited to, wired pipe telemetry, mud-pulse telemetry, acoustic telemetry, and electromagnetic telemetry. While not illustrated, bottom hole assembly 428 may include a telemetry subassembly that may transmit telemetry data to surface 108. Without limitation, an electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer (not illustrated). The digitizer may supply a digital form of the telemetry signals to information handling system 114 via a communication link 430, which may be a wired or wireless link. The telemetry data may be analyzed and processed by information handling system 114.

As illustrated, communication link 430 (which may be wired or wireless, for example) may be provided that may transmit data from bottom hole assembly 428 to an information handling system 114 at surface 108. Information handling system 114 may include a processing unit 116, a video display 120, an input device 118 (e.g., keyboard, mouse, etc.), and/or non-transitory computer-readable media 122 (e.g., optical disks, magnetic disks) that may store code representative of the methods described herein. In addition to, or in place of processing at surface 108, processing may occur downhole.

Figure 5:
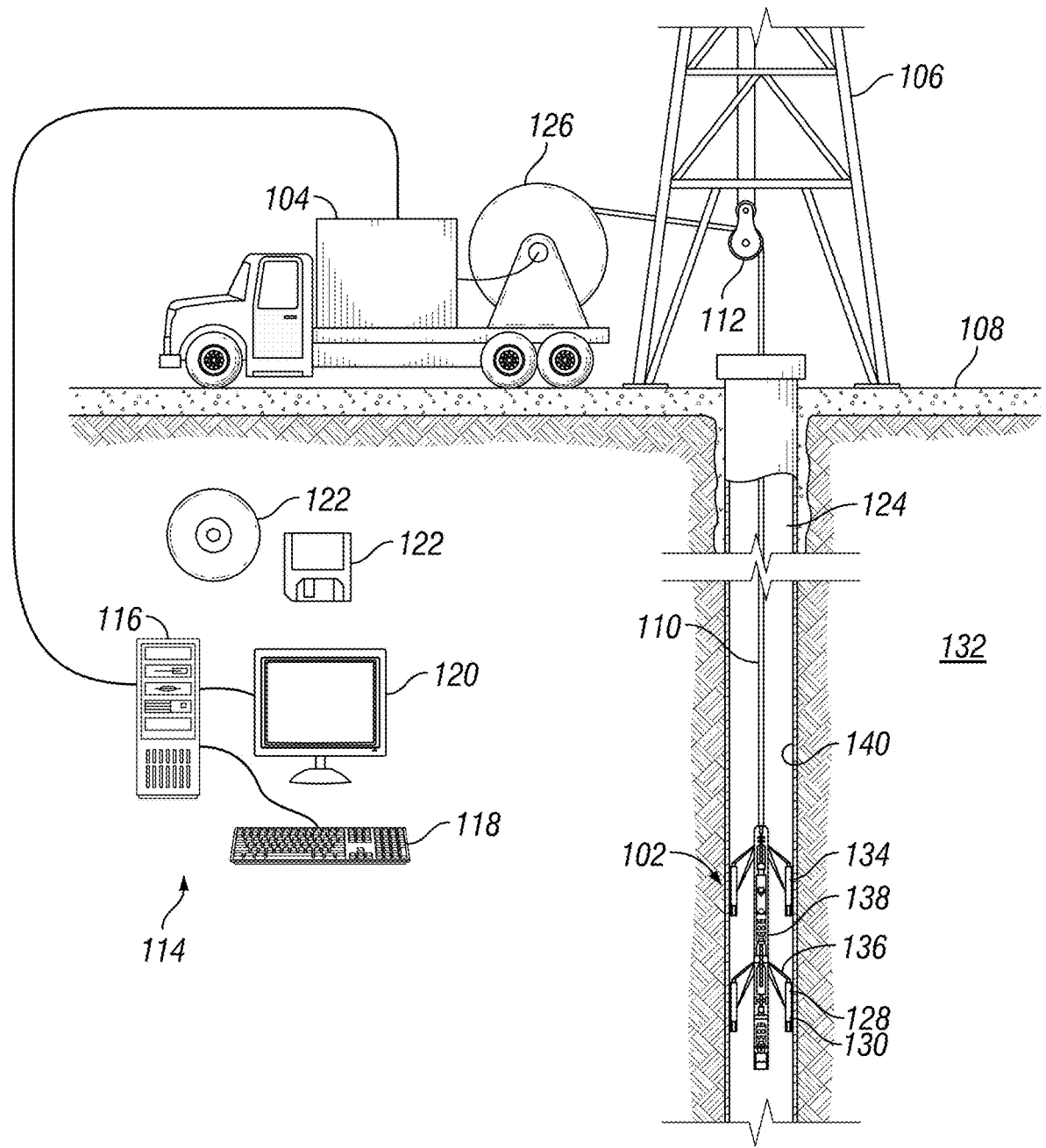
FIG. 5 illustrates an example of a well measurement system.

FIG. 5 illustrates a cross-sectional view of a well measurement system 100. As illustrated, well measurement system 100 may comprise borehole imaging device 102 attached to a winch unit 126. As illustrated, borehole imaging device 102 may be an Oil Mud Reservoir Imager (OMRI), which may be a micro-resistivity imaging tool that operates in oil based mud. The OMRI tool may generate crisp images of the borehole resistivity with an azimuthal resolution of 0.4 in. and a vertical resolution of 1 in. The OMRI tool has six articulated (in two axis) caliper arms, similar to the device in FIG. 1, however the pads 134 are not attached at the top and bottom of borehole imaging device 102, as see in the device in FIG. 1. Each pad 134 contains six resistivity sensors, providing a total of 36 micro-resistivity measurements circumferentially around the borehole 124. In examples, it should be noted that borehole imaging device 102 may not be attached to a winch unit 126. Borehole imaging device 102 may be supported by rig 106 at surface 108. Borehole imaging device 102 may be tethered to winch unit 126 through conveyance 110. Conveyance 110 may be disposed around one or more sheave wheels 112 to winch unit 126. Conveyance 110 may include any suitable means for providing mechanical conveyance for borehole imaging device 102, including, but not limited to, wireline, slickline, coiled tubing, pipe, drill pipe, drill string, downhole tractor, or the like. In some examples, conveyance 110 may provide mechanical suspension, as well as electrical connectivity, for borehole imaging device 102.

Conveyance 110 may comprise, in some instances, a plurality of electrical conductors extending from winch unit 126. Conveyance 110 may comprise an inner core of seven electrical conductors (not shown) covered by an insulating wrap. An inner and outer steel armor sheath may be wrapped in a helix in opposite directions around the conductors. The electrical conductors may be used for communicating power and telemetry between winch unit 126 and borehole imaging device 102.

Conveyance 110 may lower borehole imaging device 102 in borehole 124. Generally, borehole 124 may include horizontal, vertical, slanted, curved, and other types of borehole geometries and orientations. Imaging tools may be used in uncased sections of the borehole. Measurements may be made by borehole imaging device 102 in cased sections for purposes such as calibration.

As illustrated, borehole 124 may extend through formation 132. As illustrated in FIG. 5, borehole 124 may extend generally vertically into the formation 132, however borehole 124 may extend at an angle through formation 132, such as horizontal and slanted boreholes. While FIG. 5 generally depicts a land-based operation, those skilled in the art may recognize that the principles described herein are equally applicable to subsea operations that employ floating or sea-based platforms and rigs, without departing from the scope of the disclosure.

Information from borehole imaging device 102 may be gathered and/or processed by information handling system 114. For example, signals recorded by borehole imaging device 102 may be stored on memory and then processed by borehole imaging device 102. The processing may be performed real-time during data acquisition or after recovery of borehole imaging device 102. Processing may alternatively occur downhole or may occur both downhole and at surface. In some examples, signals recorded by borehole imaging device 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to borehole imaging device 102.

Systems and methods of the present disclosure may be implemented, at least in part, with information handling system 114. While shown at surface 108, information handling system 114 may also be located at another location, such as remote from borehole 124. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as an input device 118 (e.g., keyboard, mouse, etc.) and video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

As discussed below, methods may utilize an information handling system 114 to determine and display a formation property image of formation 132 surrounding borehole 124. This formation property image may depict boundaries of subsurface structures, such as a plurality of layers disposed in formation 132. These images may be used in reservoir characterization. Images may be considered high resolution, which may allow accurate identification of thin beds and other fine features such as fractures, clasts and vugs. These images may provide information about the sedimentology, lithology, porosity and permeability of formation 132. The images may complement, or in some cases replace, the process of coring.

Borehole imaging device 102 may comprise a plurality of sensors, such as transmitters and receivers. The sensors may include any suitable sensor for transmitting current and/or current measurements, including, but not limited to measurement electrodes. In an embodiment, measurement electrodes. As illustrated, the sensors may include an array of electrodes, shown on FIG. 5 as injection electrode 158. Borehole imaging device 102 may also comprise a return electrode 130. It should be noted that the plurality of electrodes of injection electrode 158 may be any suitable electrode and is should be further noted that return electrode 130 may be any suitable electrode. Injection electrode 158 and/or return electrode 130 may be disposed on at least one pad 134 in any suitable order. For example, a pad 134 may include only injection electrodes 158 and/or return electrodes 130. Further, a pad 134 may comprise both injection electrode 158 and return electrodes 130. Pads 134 may be attached to tool mandrel 148 by at least extension, such as arm 146 that may extend from tool mandrel 148. Arm 146 may extend pad 134 away from tool mandrel 148. In examples, arm 146 may place pad 134 in contact with borehole wall 150. It should be noted that there may be a plurality of arms 146. One or more arms 146 may place an arrangement of injection electrodes 158 and/or return electrode 130 in close proximity to the wall of borehole 124. In an embodiment, downhole tool may comprise a signal filter (not shown). The borehole wall 150 may contain a fluid, such as an oil-based or synthetic-based drilling mud in which oil or a synthetic fluid may be the continuous phase.

During operations, an operator may energize an individual electrode, or any number of electrodes, of injection electrode 158. A voltage may be applied between the injection electrode 158 and return electrode 130. The level of the voltage may be controlled by information handling system 114. This may cause currents to be transmitted through the electrode of injection electrode 158 and into formation 132. It should be noted that there may be any number of currents transmitted into formation 132. These currents may travel through the fluid disposed in borehole 124, into formation 132 and may reach back to return electrode 130. The amount of current emitted by each electrode of injection electrode 158 may be inversely proportional to the impedance seen by the electrode. This impedance may be affected by the properties of formation 132 and the mud directly in front of each electrode of the injection electrode 158. Therefore, current emitted by each electrode may be measured and recorded in order to obtain an image of the resistivity of formation 132. Alternatively, current may be emitted from the return electrode 130 and returned to injection electrode 158.

In examples, borehole imaging device 102 may operate with additional equipment (not illustrated) on surface 108 and/or disposed in a separate well measurement system (not illustrated) to record measurements and/or values from formation 132 to render a formation property image of formation 132. Without limitation, borehole imaging device 102 may be connected to and/or controlled by information handling system 114, which may be disposed on surface 108. Without limitation, information handling system 114 may be disposed downhole in borehole imaging device 102. Processing of information recorded may occur downhole and/or on surface 108. In addition to, or in place of, processing at surface 108, processing may occur downhole. Processing occurring downhole may be transmitted to surface 108 to be recorded, observed, and/or further analyzed. Additionally, information recorded on information handling system 114 that may be disposed downhole may be stored until borehole imaging device 102 may be brought to surface 108. In examples, information handling system 114 may communicate with borehole imaging device 102 through a fiber optic cable (not illustrated) disposed in (or on) conveyance 110. In examples, wireless communication may be used to transmit information back and forth between information handling system 114 and borehole imaging device 102. Information handling system 114 may transmit information to borehole imaging device 102 and may receive as well as process information recorded by borehole imaging device 102. In examples, a downhole information handling system (not illustrated) may include, without limitation, a microprocessor or other suitable circuitry, for estimating, receiving and processing signals from borehole imaging device 102. Downhole information handling system (not illustrated) may further include additional components, such as memory, input/output devices, interfaces, and the like. In examples, while not illustrated, borehole imaging device 102 may include one or more additional components, such as analog-to-digital converter, filter and amplifier, among others, that may be used to process the measurements of borehole imaging device 102 before they may be transmitted to surface 108. Alternatively, raw measurements from borehole imaging device 102 may be transmitted to surface 108.

Any suitable technique may be used for transmitting signals from borehole imaging device 102 to surface 108. As illustrated, a communication link (which may be wired or wireless and may be disposed in conveyance 110, for example) may be provided that may transmit data from borehole imaging device 102 to an information handling system 114 at surface 108.

Figure 6:
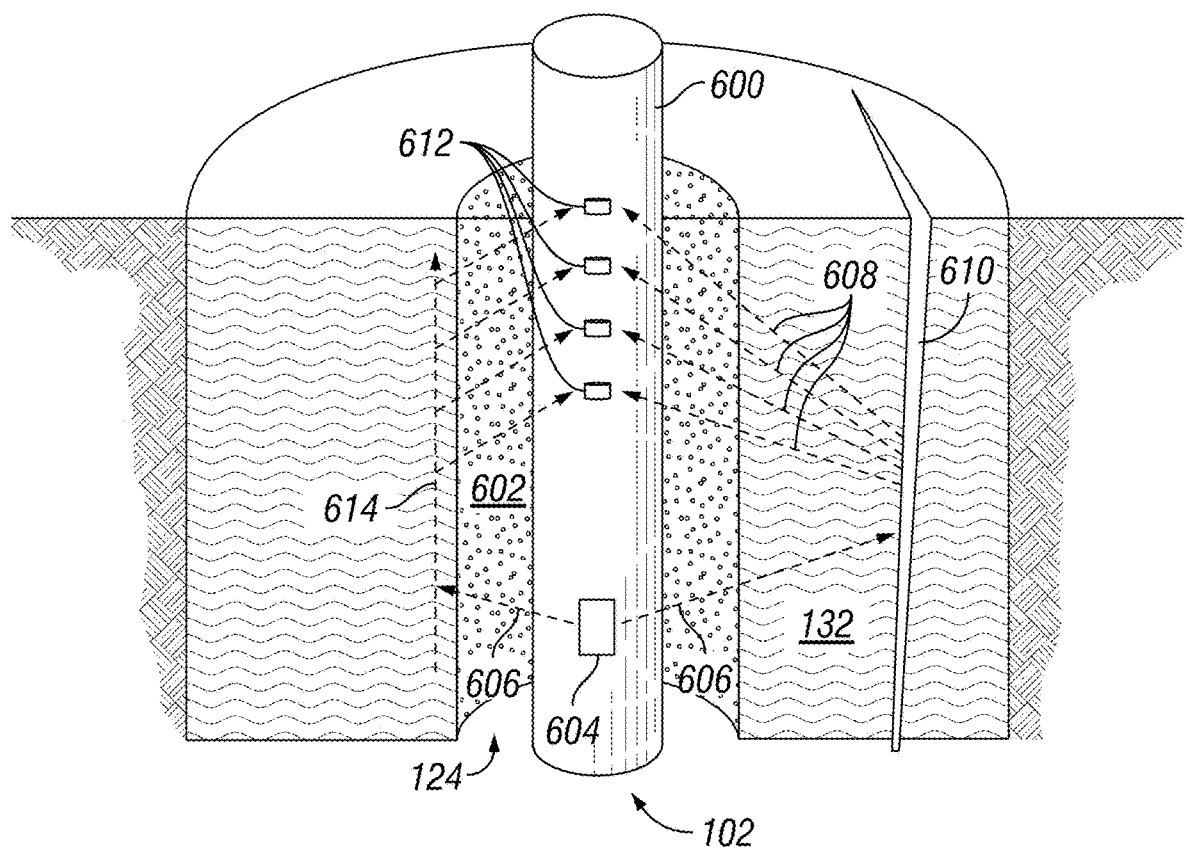
FIG. 6 illustrate an example of a borehole sonic logging tool disposed in a borehole.

FIG. 6 illustrates another embodiment of borehole imaging device 102 that is acoustic based for shear wave imaging. In examples, shear wave imaging operations may be performed with borehole sonic logging tool 600. As illustrated, borehole sonic logging tool 600 may be disposed in a borehole 124, which may be filled with fluid 602. In examples, a transmitter 604 may emit sonic waveforms 606 into borehole 124. In examples, at least one sonic waveform 606 may travel into formation 132 and may be reflected as a reflected signal 608 by a reflector 610 in formation 132. Without limitation, reflector 610 may be a formation boundary, a fault, a cave, or a fracture. In examples, reflected signals 608 may travel back to borehole 124 and may be captured by receivers 612 in borehole 124. Simultaneously, sonic waveforms 606 signals which may become trapped in borehole 124 as borehole guide waves 614 may propagate along the axis of borehole 124 and may be captured by receivers 612. In examples, borehole guide waves 614 may "wash out" reflected signals 608, which may reflect from reflector 610 away from borehole 124. For example, borehole guide waves 614 may prevent reflected signals 608 from being recorded or may be recorded over reflected signals 608.

Reflected signals 608 may be captured utilizing the same type of transmitter 604 and receivers 612. For example, both transmitter 604 and receiver 612 may be a monopole or a dipole. As illustrated in FIG. 6, both borehole guide waves 614 and reflected signals 608 may be recorded by receiver 612. Generally, a filtering procedure may remove borehole guided waves 614, which may be considered noise when imaging with reflected signals 608.

However, for detecting reflected signals 608 that travel at least one wavelength from a reflector 610, receiver 612 and transmitter 604 may not need to be the same type of device. For example, in single-well imaging techniques a transmitter 604 may emit sonic waveform 606 as a formation body wave. A formation body wave may be transmitted and received by type of transmitter 604 and/or receiver 6120. Additionally, formation body waves that may be transmitted or received by different types of transmitters 604 or receivers 612 may also be formation body waves. Therefore, using mixed (e.g., different) types of transmitters 604 and receivers 612 (e.g., monopole, dipole, etc.) may be a feasible solution for far-detection of reflected signals 608.

During measurement operations, utilizing mixed-types of transmitters 604 and receivers 612 may suppress borehole guide waves 614. For example, if transmitter 604 and receiver 612 are of different types, no signal will be recorded. However, because of tool eccentricity or other factors, coupled wave field with other azimuthal types might be generated, and receiver 612 may capture at least a portion of coupled wave fields.

FIGS. 1-6 are examples of borehole imaging devices 102. These borehole imaging devices 102 may be high-resolution wireline tools that produce maps of physical measurements of the rocks exposed on borehole wall 150 (e.g., referring to FIG. 1). They are thus two-dimensional logs, with depth and azimuth as independent variables. During measurement operations, a borehole imaging device 102 may take measurements of borehole wall 150 through any suitable means discussed above. In examples, impedance of the rocks in borehole wall 150 may be measured using a resistivity sensor disposed on pads 134 of the borehole imaging device.

Figure 7A:
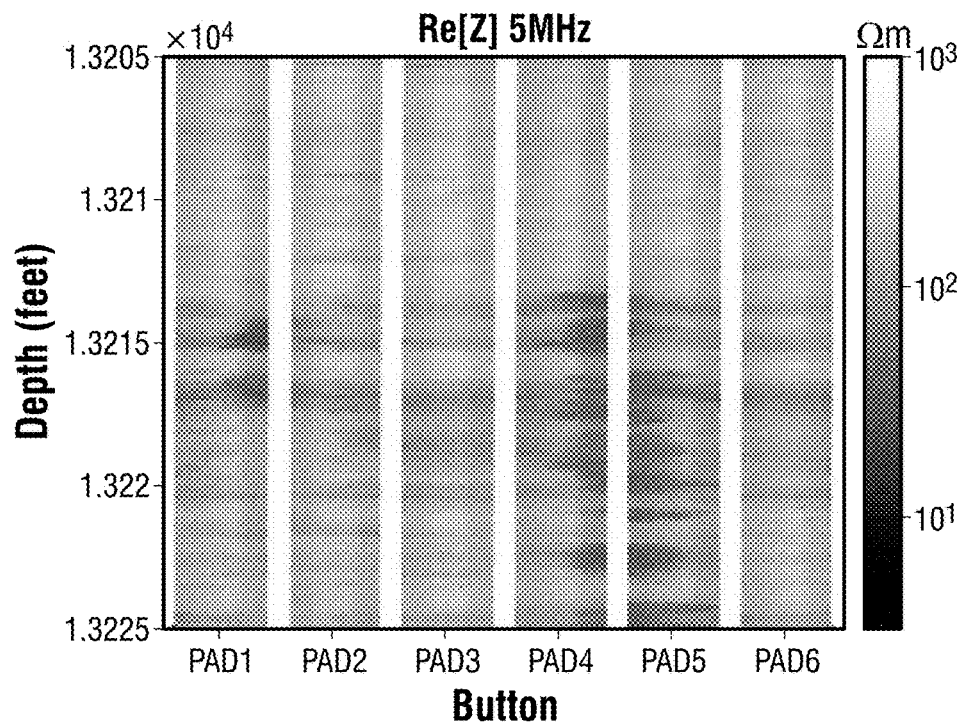
FIGS. 7A and 7B illustrate formation property measurements from a borehole imaging device.
Figure 7B:
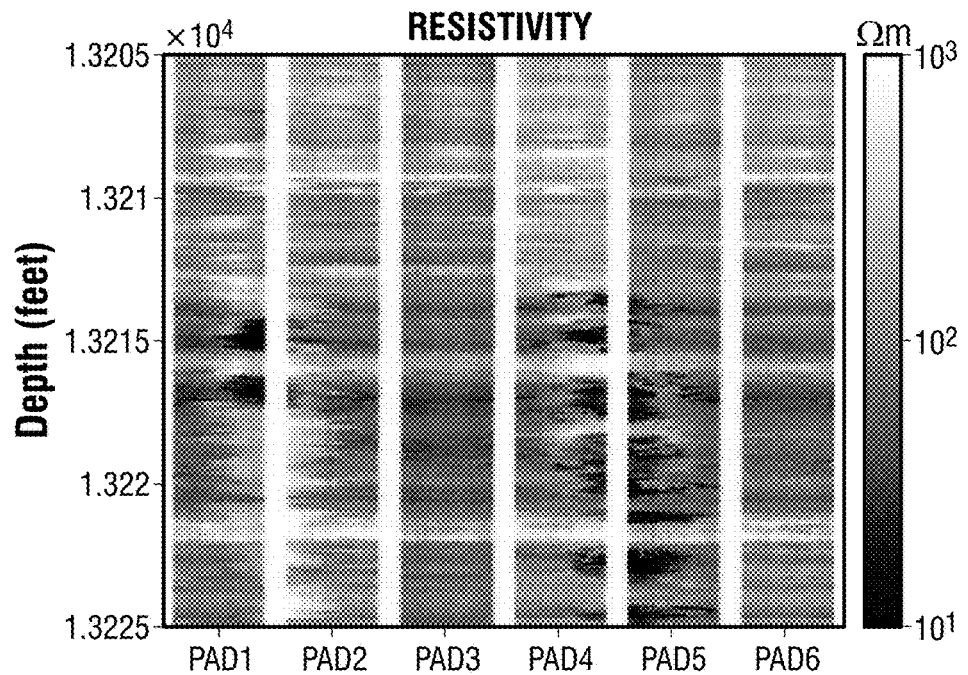

FIGS. 7A and 7B illustrates measurements taken from six pads disposed on the borehole imaging device 102 (e.g., referring to FIG. 1). In these examples, borehole imagining device 102 is taking resistivity measurements. However, as discussed below, any formation property measurements may be improved using the methods discussed below. FIG. 7A illustrates measurements taken by borehole imaging device 102. Each image are measurements at a specific pad 134 (e.g., referring to FIG. 1) which includes a ratio of complex voltage to complex current. FIG. 7B is the resistivity image that is generated from processing of the measurements seen in FIG. 7A. In examples, the processed resistivity image, while this is a resistivity image the methods described apply to all formation property measurements, seen in FIG. 7B may not be satisfactory, and the resolution and accuracy of the image is unreliable. This may be due to several factors. One factor may be an inversion database utilized to process the measurement in FIG. 7A.

The inversion database is built by either measurement or simulation based on a simplified model of borehole imaging device 102 and/or formation 132 (e.g. referring to FIGS. 1-6). One example of those over-simplified assumption is the formation being homogeneous in the azimuthal direction and in the borehole axial direction. Another factor may be due to the standoff effect, which cannot be completely eliminated in practice. The standoff is the distance from pad 134 to rock on borehole wall 150 (e.g. referring to FIG. 1) when pad 134 is not fully depressed against borehole wall 150. However, the current from the pad diffuses in formation 132, therefore the resulting resistance depends not only on the part of formation 132 in direct contact with pad 134 but also on the different properties of formation 132 in the general area of pad 134. Thus, the accuracy of a resistivity image, as seen in FIG. 7B, is not reliable when using conventional inversion method.

Figure 8A:
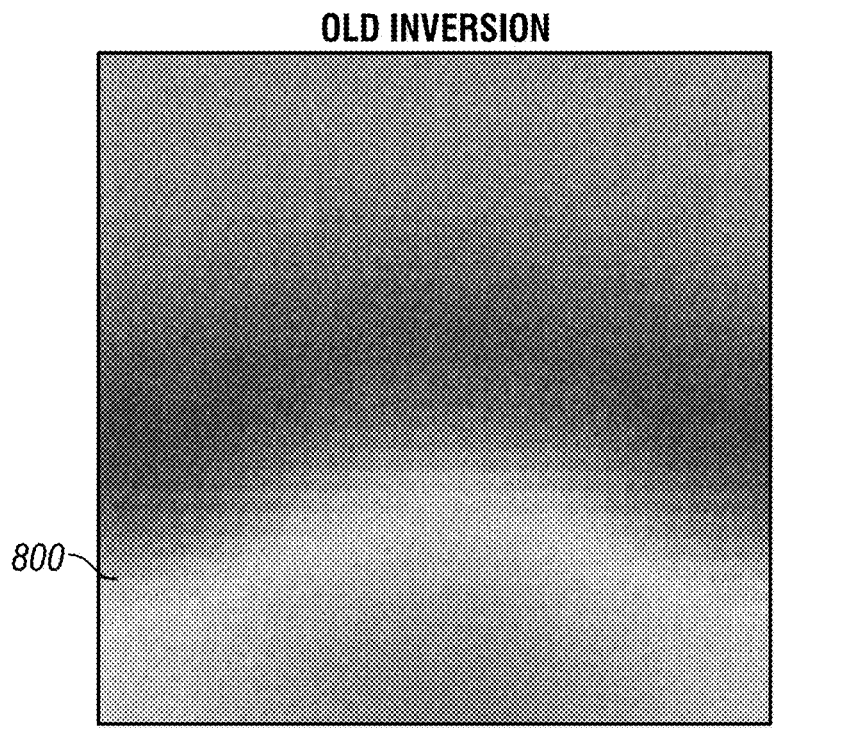
FIGS. 8A and 8B illustrates a formation property image created from the processing of the formation property measurements with an inversion scheme.
Figure 8B:
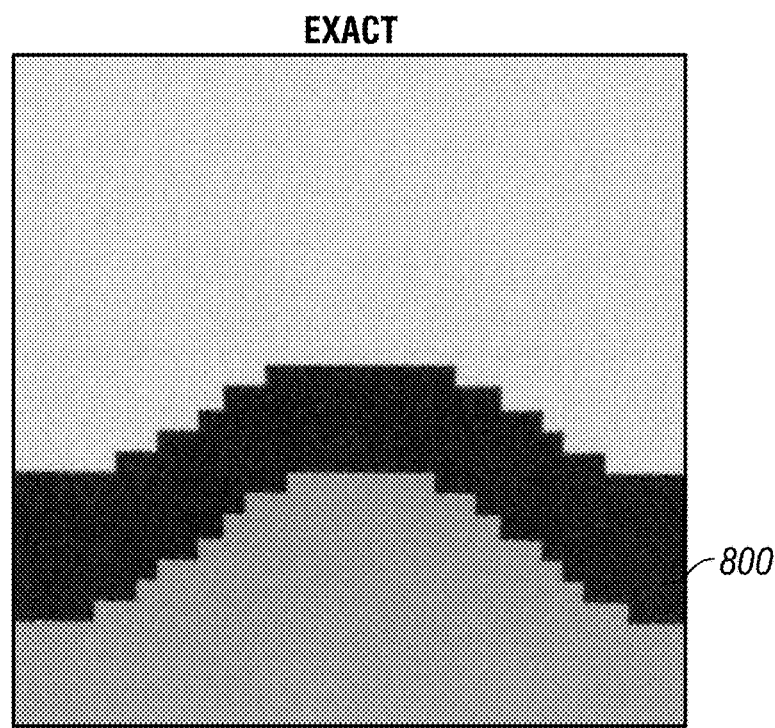

In another illustration of the problem, FIG. 8A illustrates a formation property image of a thin bed 800, which is not easily recognized due to low resolution and accuracy of the inverted formation property image when compared to the actual thin bed 800 location in FIG. 8B. Improving resolution and accuracy over current methods may be to utilize a complicated three dimensional (3-D) inversion. However, a 3-D inversion is complex, time-consuming, and may require expensive 3D electromagnetic simulations or measurements and numerical optimization. Additionally, 3-D inversions pose other challenges such as non-uniqueness and instability of a 3-D inversion.

Discussed below is a method that is more robust and easier to implement to enhance accuracy of a formation property image. The method below may generate the formation property image with existing methods, and then correct the "mistakes" of the formation property image utilizing a deep-learning neural network (DNN) based method which has been train. Training allows the DNN to learns the "habit" of the conventional inversion at multiple levels, i.e. the pattern of inaccuracy or error due to the existing inversion method. Such error patterns are so complicated and so high-dimensional that it is impossible for a human to learn and understand. The proposed method is easy and cheap to implement and deploy. Furthermore, the advantage of the deep-learning based method is the negligible time consumption in field job, because all the computational work for training the neural network has already been finished before applying the method to measurements taken by a borehole imaging device.

Additionally, the method may also enhance the accuracy of formation property images by utilizing the DNN to convert the measured formation property (e.g., referring to FIG. 7A) directly to a corrected formation property image (e.g., referring to FIG. 7B). For this method, the training of DNN may include a larger training database and more time is needed for the training to converge.

FIGS. 9A and 9B illustrate different methods for utilizing DNN to improve the accuracy of a formation property image. FIG. 9A illustrates workflow 900 where the DNN processes a formation property image to remove "mistakes" from the formation property image. Workflow 900 may be divided into a pixel based operation 902 and an image based operation 904. In pixel based operation 902, borehole imaging device 102 (e.g., referring to FIG. 1) may be utilized to take formation property measurements in block 906. Formation property measurements may include impedance measurements (ratio of measured voltage to current), formation resistivity measurements, formation impedance measurements, formation permittivity measurements, and/or standoff measurements. Additionally, the formation property measurements may be measured as a real number, an imaginary number, an absolute number, or a phase of impedance measurements at one or more frequencies. In examples, formation property measurements may be taken by one of a lower energy gamma rays reflected from a borehole wall or a bulk density of a formation. In block 906 the formation property measurements are evaluated and then passed to block 908, where a convention inversion scheme is utilized to process the formation property measurements, which generates an inverted formation property measurement for each pixel of a formation property image. The pixels from block 908, pixels are accumulated in a buffer in block 910. In block 910 a fixed size two-dimensional (2-D) image of the formation property is formed as the input to the deep-learning neural network (DNN) in block 912.

Figure 10:
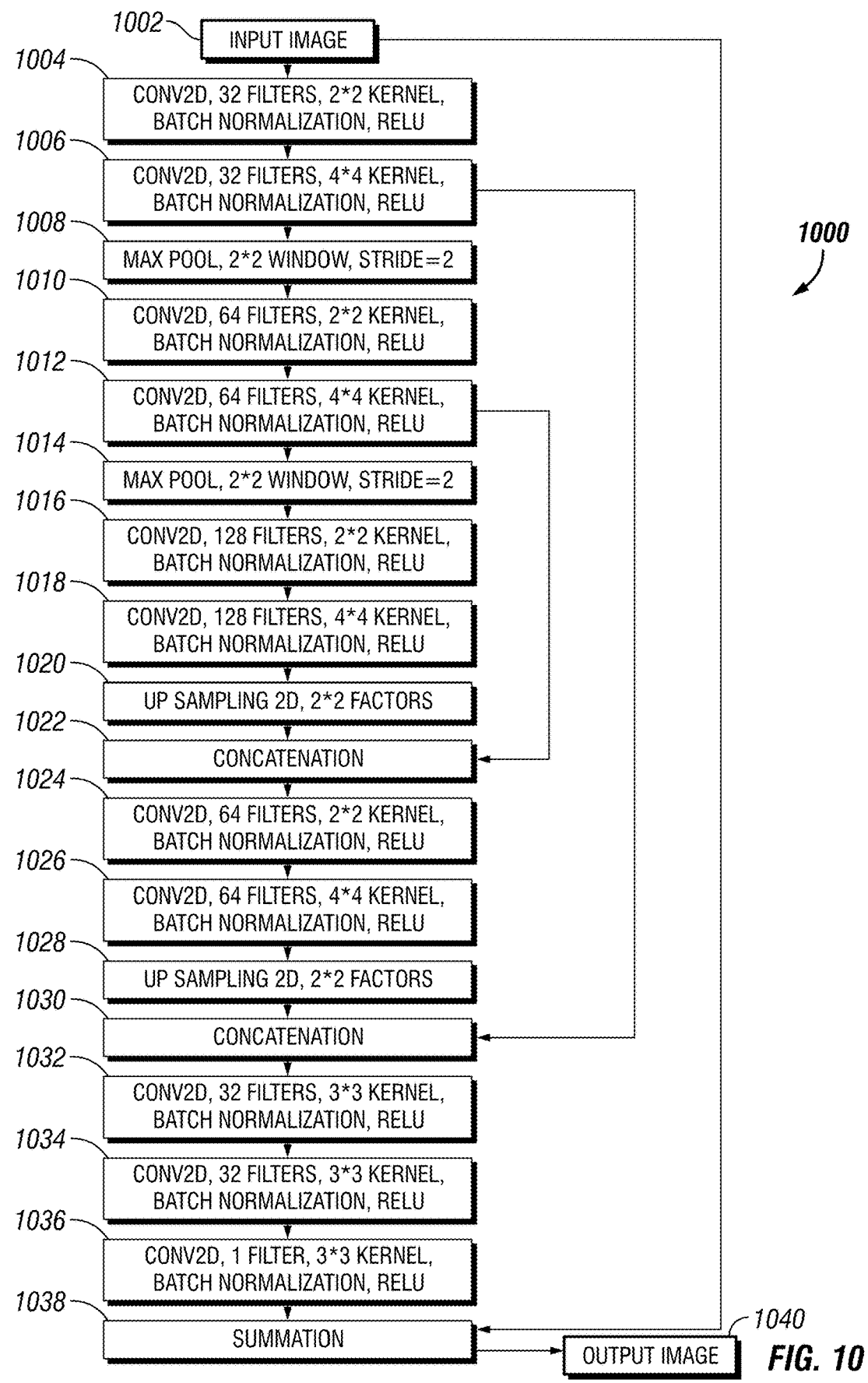
FIG. 10 is a workflow of the DNN architecture.
Figure 14:
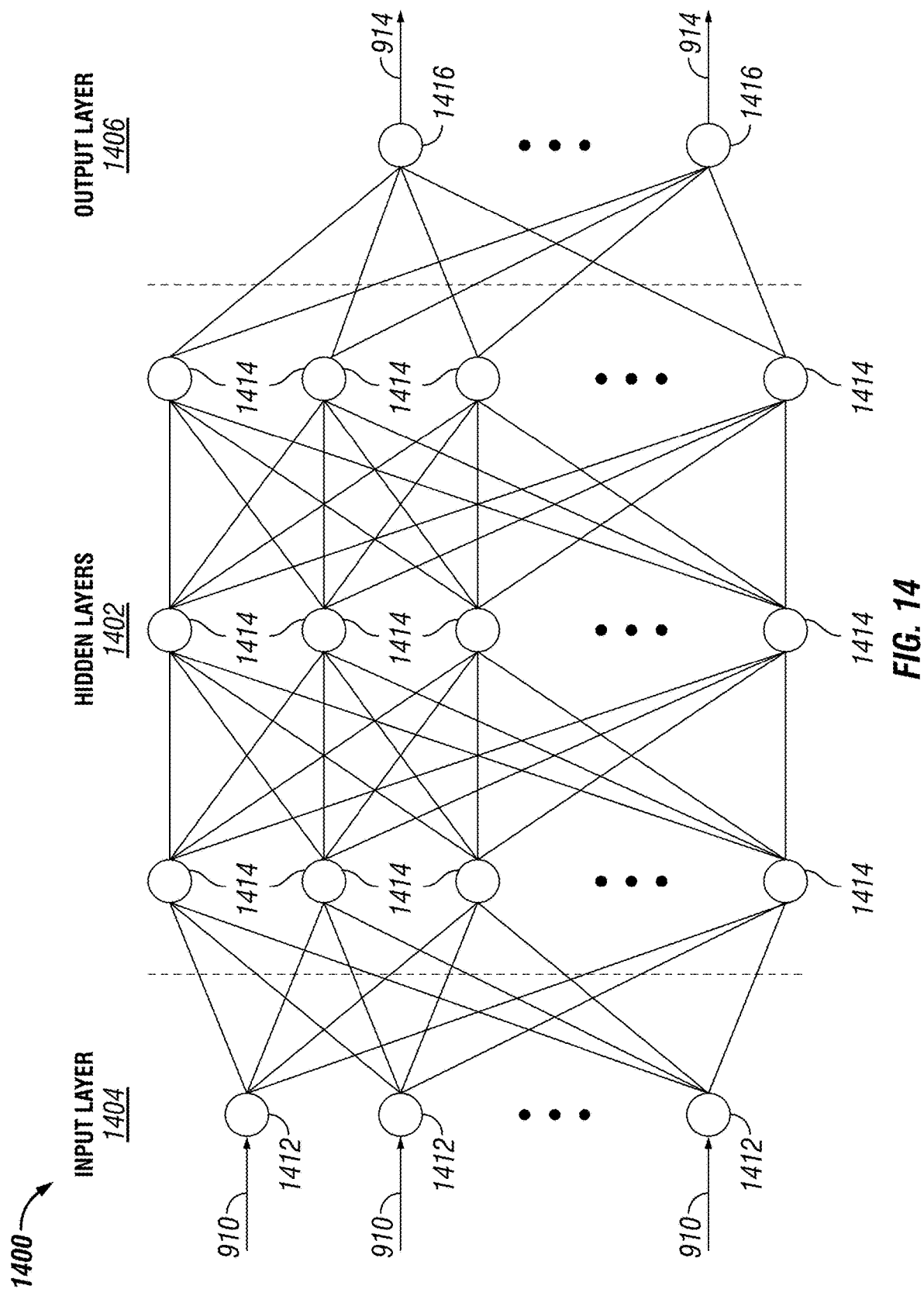
FIG. 14 illustrates a schematic of a DNN.

Referring to FIG. 14, a DNN 1400 is an artificial neural network with one or more hidden layers 1402 between input layer 1404 and output layer 1406. In examples, DNN 1400 may be software on a single information handling system 114. In other examples, DNN 1400 may software running on multiple information handling systems 114 connected wirelessly and/or by a hard wired connection in a network of multiple information handling systems 114. As illustrated, input layer 1404 may include 2-D image of the formation property from block 910 (e.g., referring to FIG. 9), and output layers 1406 may form a corrected formation property image as an output in block 914 (e.g., referring to FIG. 9). During operations, input data, 2-D image of the formation property in block 910, is given to neurons 1412 in input layer 1404. Neurons 1412 are defined as individual or multiple information handling systems 114 connected in a network, which may compute the 2-D image of the formation property according to the steps discussed below in FIG. 10. The output from neurons 1412 may be transferred to one or more neurons 1414 within one or more hidden layers 1402. Hidden layers 1402 includes one or more neurons 1414 connected in a network that further process information from neurons 1412 according the steps discussed below in FIG. 10. The number of hidden layers 1402 and neurons 1412 in hidden layer 1402 may be determined by an operator that designs DNN 1400. Hidden layers 1402 is defined as a set of information handling system 114 assigned to specific processing steps for workflow 1000, which is shown in FIG. 10. Hidden layers 1402 spread computation to multiple neurons 1406, which may allow for faster computing, processing, training, and learning by DNN 1400. The processing in hidden layers 1402 removes "mistakes" from a 2-D image of the formation property from block 908. Output layers 1406 may combine the processing in hidden layers 1402, using neurons 1416, to form a corrected formation property image for block 914 based on workflow 1000.

FIG. 10 illustrates a workflow 1000 for DNN 1400 (e.g., referring to FIG. 14) to improve the accuracy and reliability of the inverted formation property measurement. Increasing accuracy and reliability of formation property measurements in block 906 (e.g. referring to FIG. 9) may be performed by removing one or more artifacts. Artifacts may be defined as and include blurring, measurements contamination, or resistivity rollover. As illustrate, measurements from the borehole imaging device 102 (e.g., referring to FIG. 1) are formed into an image in block 1002, as discussed above with a buffer in block 910. The image is mapped into a grid of pixels, wherein each pixel has its own specific location on the grid as well as a numerical value defining its color and the intensity of that color. The formation property image formed in block 1002 is transferred to block 1004 for further processing in DNN 1400 (e.g., referring to FIG. 14). Blocks 1004 to 1038 may be performed by neurons 141 in hidden layers 1402 in any suitable matter (e.g., referring to FIG. 14). As illustrated, the formation property image formed in block 1002 may also be transferred to block 1038, further discussed below.

Block 1004 includes a 2D convolution neural network, identified as "Conv2D." The Conv2D function may be used for image enhancement to better observe measurements from borehole imaging device 102 (e.g., referring to FIG. 1). As defined, the 2D convolution neural network is a fully connected network in which each neuron (e.g., referring to FIG. 14) is connected to all neurons in the next layer, as seen in FIG. 14 for hidden layer 1402 (e.g., referring to FIG. 14), as noted above. In block 1004 the formation property image is processed with the Conv2D function. The Conv2D includes parameters of 32 filters, kernels with a 2 by 2 dimension, batch normalization, and a rectified linear unit (RELU) activation function. A kernel is an independent grid of pixels with a predetermined size. In this Conv2D function, the predetermined kernel size is 2 rows by 2 column or a 2×2 square with 4 pixels. Batch normalization is defined as an operation in which variances and means of each layer input on the DNN from each mini-batch. The number of filters specifies how many convolutions may be performed.

In block 1004, the grid from block 1002 is undergoes convolution using the Conv2D function. In a single convolution, the kernel is first placed over the top left section of the inputted grid. In doing so every pixel in the kernel is matched with another pixel from the grid. Each match is multiplied, resulting in the same number of products as the size of the kernel (4 in this case). Every product of multiplication is added together and placed in an activation grid as its first and top left pixel. Then the kernel may be shifted to the right by 1 pixel and the process described above may be repeated. The same multiplications and additions may occur, and the final product is disposed in the activation grid as a top-second left pixel. The process may continue until the kernel finishes the top right computation on the grid. At this stage, processing the kernel may continue at the leftmost-second to the top pixel on the grid and proceed right as described above. This cycle may continue until the kernel sweeps across the grid from block 1002. This single convolution is applied 32 more times to produce 32 activation maps. The second step of the Conv2D function is applied using an activation function, identified as a rectified linear unit (RELU). The RELU function simply takes value of a pixel as an input and converts it to 0 if the pixel has a negative value, however if the pixel has a 0 or a positive value the RELU function's output is the same as its input. The RELU is implemented for every pixel of every activation map. From the Conv2D processing a final image is formed. The final image may be formed by taking the value of the most top-left pixel in every activation grid, adding them together, and then dividing by the total number of activation grids, this value will be the most top left pixel in the final image. This averaging process is repeated to determine the value of every pixel in the final grid, which forms the final image.

The final image generated in block 1004 is sent to block 1006 where the same Conv2D function is performed, however with an altered parameter, increasing the kernel size to 4 columns by 4 rows. Block 1006 applies the Conv2D function, as discussed above, with this altered parameter and generates a grid that may be sent to block 1008 and block 1030, which is discussed below.

In blocks 1004 and 1006, the Conv2D function was utilized to enhance the data, however, there is a possibility that blocks 1004 and 1006 may have over-fitted the data. A Max Pool function is applied in block 1008 to provide an abstract form of the data as well as reduce the special size to reduce the computation time. The parameters of a 2 by 2 window and a stride of 2 are utilized for the Max Pool function. However, any suitable parameters may be utilized for the Max Pool Function. The 2 by 2 window is a square of 4 empty pixels. The window is placed at the top left corner of the grid from block 1006. The window procures 4 pixels directly from the grid and writes the pixel with the highest value of the 4 pixels into an output grid. The window empties its pixels and moves to the right by a stride. The stride is the number of shifts along the inputted grid the window must transverse before it may evaluate 4 more pixels, in this case the stride is 2. However, and suitable stride may be utilized for this process. The window again procures 4 more pixels, writes the greatest pixel to the output grid, and moves to the right by a stride. This process continues until the window reaches the end of the grid from block 1006. After completion, the output grid from block 1008 may transverse to the $3^{rd}$ highest-leftmost pixel of the input grid and continue until the output grid is formed. The output grid is then sent to block 1010 for further processing.

In block 1010, the grid from block 1008 is processed with a Conv2D function with parameters that are 64 filters, 2 by 2 kernels, batch normalization, and the activation function to be implemented is a RELU. The Conv2D function operates and functions as described above to form an output. The output from block 1010 is sent to block 1012. In block 1012, the output from block 1010 undergoes processing from a Conv2D function with parameters that are 64 filters, 4 by 4 kernels, batch normalization, and a RELU. The output from block 1012 may be send to block 1022, discussed below, and block 1014. At block 1014 another Max Pool function with parameters of a 2 by 2 window and a stride of 2 is applied to the input from block 1012. This Max Pool function generates a new grid to keep the dimensions of the input from block 1012 in line with the initial input from block 1002. The new grid is sent to block 1016 where another Conv2D function processed the information from block 1014 with parameters that are 128 filters, 2 by 2 kernels, batch normalization, and the activation function to be implemented is a RELU. The resulting grid is sent to block 1018. At block 1018, the information from block 1016 is processed by a Conv2D function with the parameters that are 128 filters, 4 by 4 kernels, batch normalization, and an activation function to be implemented is a RELU. The resulting grid is sent to block 1020 for further processing.

The previous grid from block 1018 is run through an UP Sampling 2D function with parameters of the function is a 2*2 factor in block 1020. UP Sampling 2D operates and functions to maintain the integrity of the image during processing in the DNN. During UP sampling, a 2*2 factor may be utilized to double each spatial dimension. In the UP Sampling 2D function the top-leftmost pixel from the previous grid may be copied, and 4 identical pixels may be inserted into the top-leftmost corner of a new grid. The process may slide to the right and repeat until the top-rightmost pixel is inserted into the top-rightmost corner of the new grid. The top-leftmost pixel from the previous grid may be copied and inserted below the first insertion identified above. This process may be repeated until the entirety of the previous grid from block 1018 is copied into the new grid in block 1020. The grid generated in block 1020 is sent to block 1022.

In block 1022, the grid from block 1020 and the information from block 1012 may be processed utilizing a concatenation in block 1022. Concatenation is defined as an operation in which output matrices from block 1020 and block 1012 are stacked in a $3^{rd}$ dimension.

The output grid from block 1022 is sent to block 1024 where it is processed with a Conv2D function with parameters that includes 64 filters, 2 by 2 kernels, batch normalization, and an activation function to be implemented is a RELU. This processing operates and functions as described above. The grid formed in block 1024 is sent to block 1026.

The grid generated at 1024 may be passed into block 1026 where it is processed with a Conv2D function with parameters that includes 64 filters, 2 by 2 kernels, and the activation function to be implemented is a RELU. This processing operates and functions as described above. The information from block 1026 is sent to block 1028. At block 1028 the UP Sampling 2D function is applied to the input, the grid generated at block 1026. This processing operates and functions as described above. The grid formed in block 1026 is sent to block 1028.

The information from blocks 1028 and 1006 are processed in block 1030 utilizing a concatenation. Concatenation is defined as an operation in which output matrices from block 1028 and block 1006 are stacked in a $3^{rd}$ dimension.

The output from block 1030 is sent to block 1032 where it is processed with a Conv2D function is performed that includes the parameters of 32 filters, 3 by 3 kernels, batch normalization, and the activation function to be implemented is a RELU. This processing operates and functions as described above. The generated grid from block 1032 is sent to block 1034 where it is processed with a Conv2D function is performed that includes the parameters of 32 filters, 3 by 3 kernels, batch normalization, and the activation function to be implemented is a RELU. This processing operates and functions as described above. The output from block 1034 is sent to block 1036 where it is processed with a Conv2D function with parameters that include 1 filter, 3 by 3 kernels, batch normalization, and the activation function to be implemented is a RELU. The output grid from block 1036 is sent to block 1038.

In block 1038 a summation is performed on the information from block 1038 and block 1002. A Summation functions is defined and operates to sum one or more matrices, which are found in block 1038 and block 1002. The resulting grid is the final output of the formation property image in block 1040 as a corrected formation property image. Additionally, summation may be replaced with operations of concatenation (described above), max pooling, or up-sampling. Max pooling is a sample-based discretization process that may down-sample an input representation (sample, measurement, image, hidden-layer, matric, etc.) reducing its dimensionality and allowing for assumption to be made about feature contained in the sub-regions binned. Up-sampling is a process in which zero-valued input representations are added between original input representations to increase a sampling rate.

As illustrated in FIG. 10, DNN 1400 (e.g., referring to FIG. 14) learns the error of existing inversions by comparing correct formation property images with inaccurate formation property images formed from inaccurate inversion results. The learning is done at multiple levels, to capture the fine details and overall picture formed from the finer details. To train DNN 1400, a database is built by either simulation or measurement based on the following guidelines. The guidelines for the database are that the database include at least tens of thousands of samples. Each sample may include a true formation property image of a formation property and a raw formation property image distorted by one or more artifacts. Another guideline may be simulating or measuring as many formation property image patterns as possible. These formation property image patterns correct formation property images and may include all suitable geometries. Additionally, the guidelines may include that a simulation be performed covering the whole range of possible standoff distances and that for each operating frequency, an individual database must be built. After building the database, based on the guidelines discussed above, training of the DNN with the database may begin.

Training of the DNN is conducted by updating the weight parameters to minimize the loss function. This may be performed by minimizing a misfit between the raw formation property image and the true formation property image. The error $E_n$ between the true formation property image and the corrected formation property image produced by the DNN for the $n^{th}$ training example is defined as the sum of square errors of the logarithm of resistivity for each pixel, as shown below:

$$E_n = \sum_i (\log_{10} p_i^n - \log_{10} q_i^n)^2 \qquad (4)$$

where n is the index of training examples, i is the index of pixels, p is the true formation property image, and q is the inverted formation property measurement.

The loss function L is the mean square error for the training batch, seen below.

$$L = \sum_{n \in batch} E_n \qquad (5)$$

A 10-folder cross-validation is used to evaluate the accuracy of the DNN. To avoid over-fitting, the training is stopped if no improvement is seen in a validation set for consecutive 3 epochs.

Figure 11A:
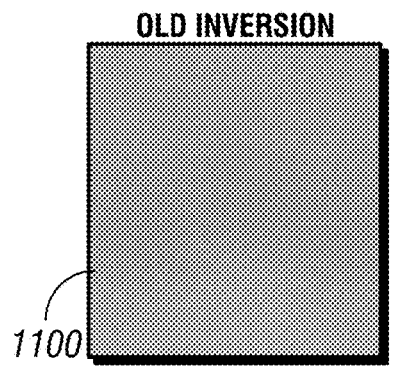
FIGS. 11A-11C are examples of improving a formation property image.
Figure 11B:
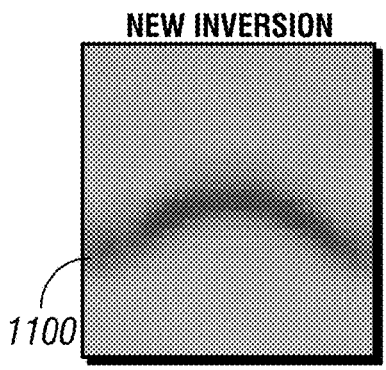
Figure 11C:
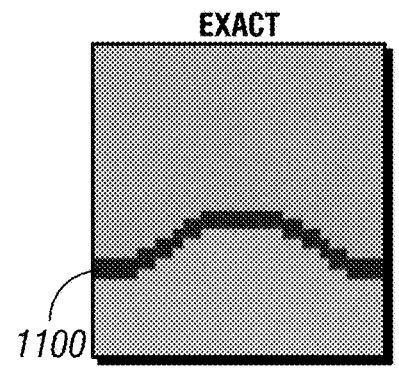
Figure 12A:
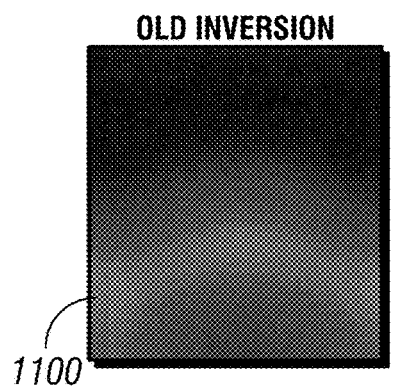
FIGS. 12A-12C are other examples of improving a formation property image.
Figure 12B:
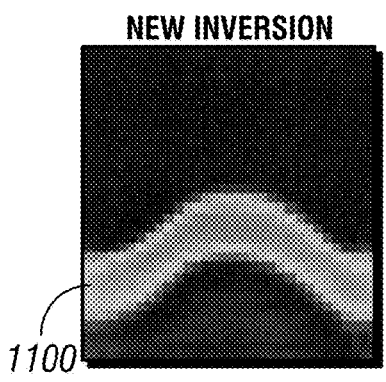
Figure 12C:
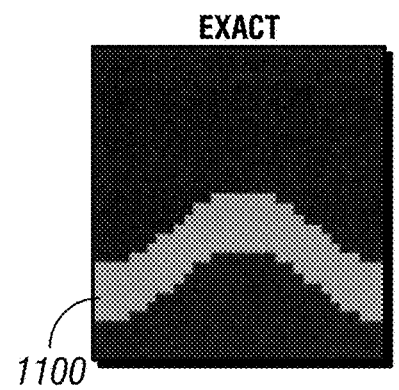
Figure 13A:
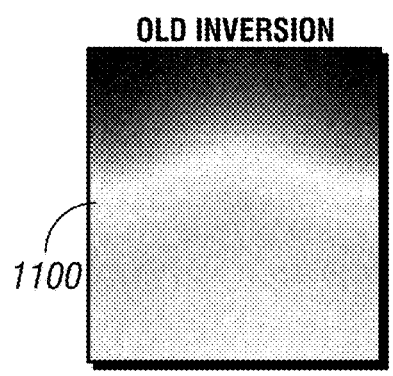
FIGS. 13A-13C are other examples of improving a formation property image.
Figure 13B:
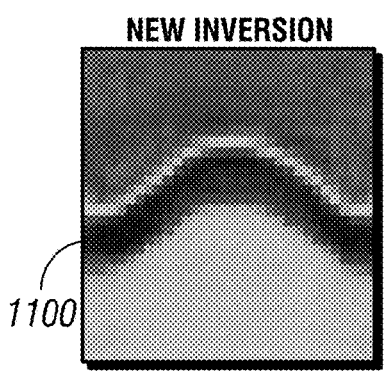
Figure 13C:
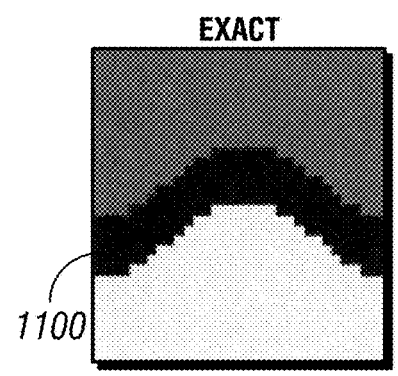

FIGS. 11A-13C illustrate formation property images that have been processed with a DNN 1400 (e.g., referring to FIG. 14) according to the methods described above. FIGS. 11A, 12A, and 13A illustrate a thin bed layer 1100 of low contrast, which may not be clearly visualized by current inversion methods. This may be due to a standoff effect, discussed above. Current methods may enhance thin bed layer 1100 using a model to build a look up table, which may produce the images in FIGS. 11B, 12B, and 13B, of a boundary between two bed-layers that is blurred. FIGS. 11C, 12C, and 13C illustrate a formation property image that has been enhanced using the DNN methods, discussed above, to identify thin bed layer 1100. The DNN methods may produce a formation property image in which the boundary position is clear and accurate.

Referring back to FIG. 9A, image based operation 904 may input the formation property image from block 910 into block 912, which is DNN 1400 (e.g., referring to FIG. 14). DNN 1400 may process the formation property image, as discussed above, for a final output in block 914. The final output is a corrected formation property image. As discussed above, DNN 1400 may also be utilized to enhance the formation property measurements without utilizing an inversion scheme, which is illustrated in workflow 916, as seen in FIG. 9B.

FIG. 9B illustrates workflow 916, which includes pixel based operation 902 and image based operation 904. In pixel based operation 902, borehole imaging device 102 (e.g., referring to FIG. 1) may be utilized to take formation property measurements in block 906. In block 906 the formation property measurements are evaluated and then passed to a buffer in block 910, which operates and functions as described above. The image based operation 904 may input the formation property measurements from block 910 into block 912, which is DNN 1400 (e.g., referring to FIG. 14). DNN 1400 may process the formation property measurements, as discussed above, for a final output in block 914. The final output is a corrected formation property image, which did not utilize and inversions scheme as seen in workflow 900.

Improvements from the methods and systems described above may produce an enhanced formation property image. The formation property image may be reliable, accurate, and detailed. Additionally, the formation property image may be enhanced using DNN 1400 (e.g., referring to FIG. 14) or formed using DNN 1400 and formation property measurements. The systems and methods for a DNN 1400 to form or enhance formation property images are discussed above, including one or more of the following statements.

Statement 1. A method for enhancing a formation property image may comprise taking at least one set of formation property measurements with a borehole imaging device, arranging the at least one set of formation property measurements into a two-dimensional image with a buffer, feeding the two-dimensional image into a deep-learning neural network (DNN), and forming a corrected formation property image from the two-dimensional image.

Statement 2. The method of statement 1, wherein the DNN comprises an input layer, one or more hidden layers, and an output layer.

Statement 3. The method of statement 2, wherein the one or more hidden layers perform operations that include a concatenation, a summation, a max pooling, or an up-sampling.

Statement 4. The method of statements 1 or 2, wherein the borehole imaging device is disposed into a wellbore by a conveyance and wherein the conveyance is a wireline or a tool string.

Statement 5. The method of statements 1, 2, or 4, wherein the at least one set of formation property measurements comprises one of a real number, an imaginary number, an absolute number, or a phase of impedance measurements at one or more frequencies.

Statement 6. The method of statements 1, 2, 4, or 5, wherein the at least one set of formation property measurements include a formation resistivity, a formation impedance, a formation permittivity, or a standoff measurement.

Statement 7. The method of statements 1, 2, or 4-6, wherein the DNN is configured to correct the two-dimensional image for one or more artifacts which include blurring, measurements contamination, or resistivity rollover.

Statement 8. The method of statements 1, 2, or 4-7, further comprising building a database with one or more samples and training the DNN with the database, wherein the one or more samples are simulated data or actual data.

Statement 9. The method of statement 8, wherein the one or more samples are a true formation property image of a formation property and at least one corresponding raw formation property image distorted by one or more artifacts.

Statement 10. The method of statement 9, wherein training the DNN comprises minimizing a misfit between the raw formation property image and the true formation property image of the at least one set of formation property measurements.

Statement 11. A method for enhancing a formation property image may comprise taking at least one set of formation property measurements with a borehole imaging device, inverting the at least one set of formation property measurements to form at least one set of inverted formation property measurements, arranging the at least one set of inverted formation property measurements into a two-dimensional image with a buffer, feeding the two-dimensional image into a deep-learning neural network (DNN), and forming a corrected formation property image from the two-dimensional image.

Statement 12. The method of statement 11, wherein the DNN is configured to correct the two-dimensional image for one or more artifacts which include blurring, measurements contamination, or resistivity rollover.

Statement 13. The method of statement 12, further comprising building a database with one or more samples and training the DNN with the database, wherein the one or more samples are simulated data or actual data.

Statement 14. The method of statement 13, wherein the one or more samples are a true formation property image of a formation property and at least one corresponding raw formation property image distorted by one or more artifacts Statement 15. The method of statement 14, wherein training the DNN comprises minimizing a misfit between the raw formation property image and the true formation property image of the at least one set of formation property measurements.

Statement 16. The method of statements 11 or 12, wherein the at least one set of formation property measurements comprises one of a real number, an imaginary number, an absolute number, or a phase of impedance measurements at one or more frequencies.

Statement 17. The method of statements 11, 12, or 16, wherein the at least one set of formation property measurements comprises one of a lower energy gamma rays reflected from a borehole wall or a bulk density of a formation.

Statement 18. The method of statements 11, 12, 16, or 17, wherein the borehole imaging device is disposed into a wellbore by a conveyance and wherein the conveyance is a wireline or a tool string.

Statement 19. The method of statements 11, 12, or 16-18, wherein the at least one set of formation property measurements include a formation resistivity, a formation resistivity, a formation permittivity, or a standoff measurement.

Statement 20. The method of statements 11, 12, or 16-19 wherein the DNN comprises an input layer, one or more hidden layers, and an output layer, and wherein the hidden layers perform operations that include a concatenation, a summation, a max pooling, or an up-sampling.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for enhancing a formation property image comprising:
    taking at least one set of formation property measurements with a borehole imaging device;
    arranging the at least one set of formation property measurements into a two-dimensional image with a buffer, wherein the buffer fixes the size of the two-dimensional image;
    feeding the two-dimensional image into a deep-learning neural network (DNN); and
    forming a corrected formation property image from the two-dimensional image.

2. The method of claim 1, wherein the DNN comprises an input layer, one or more hidden layers, and an output layer.

3. The method of claim 2, wherein the one or more hidden layers perform operations that include a concatenation, a summation, an up sampling or a max pooling.

4. The method of claim 1, wherein the borehole imaging device is disposed into a wellbore by a conveyance and wherein the conveyance is a wireline or a tool string.

5. The method of claim 1, wherein the at least one set of formation property measurements comprises one of a real number, an imaginary number, an absolute number, or a phase of impedance measurements at one or more frequencies.

6. The method of claim 1, wherein the at least one set of formation property measurements include a formation resistivity, a formation impedance, a formation permittivity, or a standoff measurement.

7. The method of claim 1, wherein the DNN is configured to correct the two-dimensional image for one or more artifacts which include blurring, measurements contamination, or resistivity rollover.

8. The method of claim 1, further comprising building a database with one or more samples and training the DNN with the database, wherein the one or more samples are simulated data or actual data.

9. The method of claim 8, wherein the one or more samples are a true formation property image of a formation property and at least one corresponding raw formation property image distorted by one or more artifacts.

10. The method of claim 9, wherein training the DNN comprises minimizing a misfit between the raw formation property image and the true formation property image of the at least one set of formation property measurements.

11. A method for enhancing a formation property image comprising:
    taking at least one set of formation property measurements with a borehole imaging device;
    inverting the at least one set of formation property measurements to form at least one set of inverted formation property measurements;
    arranging the at least one set of inverted formation property measurements into a two-dimensional image with a buffer, wherein the buffer fixes the size of the two-dimensional image;
    feeding the two-dimensional image into a deep-learning neural network (DNN); and
    forming a corrected formation property image from the two-dimensional image.

12. The method of claim 11, wherein the DNN is configured to correct the two-dimensional image for one or more artifacts which include blurring, measurements contamination, or resistivity rollover.

13. The method of claim 12, further comprising building a database with one or more samples and training the DNN with the database, wherein the one or more samples are simulated data or actual data.

14. The method of claim 13, wherein the one or more samples are a true formation property image of a formation property and at least one corresponding raw formation property image distorted by one or more artifacts.

15. The method of claim 14, wherein training the DNN comprises minimizing a misfit between the raw formation property image and the true formation property image of the at least one set of formation property measurements.

16. The method of claim 11, wherein the at least one set of formation property measurements comprises one of a real number, an imaginary number, an absolute number, or a phase of impedance measurements at one or more frequencies.

17. The method of claim 11, wherein the at least one set of formation property measurements comprises one of a lower energy gamma rays reflected from a borehole wall or a bulk density of a formation.

18. The method of claim 11, wherein the borehole imaging device is disposed into a wellbore by a conveyance and wherein the conveyance is a wireline or a tool string.

19. The method of claim 11, wherein the at least one set of formation property measurements include a formation resistivity, a formation resistivity, a formation permittivity, or a standoff measurement.

20. The method of claim 11, wherein the DNN comprises an input layer, one or more hidden layers, and an output layer, and wherein the hidden layers perform operations that include a concatenation, a summation, an up sampling or a max pooling.

* * * * *